US011378015B2

(12) United States Patent
Spruce

(10) Patent No.: US 11,378,015 B2
(45) Date of Patent: *Jul. 5, 2022

(54) RELIABLE GEARBOX FOR GAS TURBINE ENGINE

(71) Applicant: ROLLS-ROYCE PLC, London (GB)

(72) Inventor: Mark Spruce, Derby (GB)

(73) Assignee: ROLLS-ROYCE PLC, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/244,208

(22) Filed: Apr. 29, 2021

(65) Prior Publication Data

US 2021/0254555 A1    Aug. 19, 2021

Related U.S. Application Data

(63) Continuation of application No. 17/161,004, filed on Jan. 28, 2021, now Pat. No. 11,022,046, which is a continuation of application No. 16/807,744, filed on Mar. 3, 2020, now Pat. No. 10,961,918.

(30) Foreign Application Priority Data

Dec. 5, 2019   (GB) ...................................... 1917781

(51) Int. Cl.
  *F02C 7/36*     (2006.01)
  *F16H 1/28*     (2006.01)
(52) U.S. Cl.
  CPC ................. *F02C 7/36* (2013.01); *F16H 1/28* (2013.01); *F05D 2220/36* (2013.01)

(58) Field of Classification Search
CPC .. F02C 7/36; F02C 7/32; F01D 25/164; F01D 15/12; F02K 3/06
See application file for complete search history.

(56) References Cited

U.S. PATENT DOCUMENTS

| | | |
|---|---|---|
| 5,509,865 A | 4/1996 | Hall, III |
| 10,436,035 B1 | 10/2019 | Baralon et al. |
| 10,914,241 B1 | 2/2021 | Spruce |
| 2010/0261571 A1 | 10/2010 | Matsuoka et al. |
| 2010/0292044 A1 | 11/2010 | Lahtinen et al. |
| 2013/0287575 A1 | 10/2013 | McCune et al. |
| 2013/0331223 A1 | 12/2013 | McCune et al. |
| 2013/0336791 A1 | 12/2013 | McCune et al. |
| 2015/0345398 A1 | 12/2015 | McCune et al. |
| 2015/0377143 A1 | 12/2015 | Sheridan et al. |
| 2017/0342858 A1 | 11/2017 | McCune et al. |
| 2018/0003289 A1 | 1/2018 | Zambon et al. |
| 2018/0216725 A1 | 8/2018 | Scognamiglio et al. |
| 2019/0234510 A1 | 8/2019 | Brillon et al. |

(Continued)

*Primary Examiner* — Woody A Lee, Jr.
*Assistant Examiner* — John S Hunter, Jr.
(74) *Attorney, Agent, or Firm* — Oliff PLC

(57) ABSTRACT

An engine for an aircraft has an engine core having a turbine, a compressor, and a core shaft connecting the turbine to the compressor; a fan located upstream of the engine core, the fan having a plurality of fan blades; and a gearbox. The gearbox is arranged to receive an input from a gearbox input shaft portion of the core shaft and to output drive to the fan so as to drive the fan at a lower rotational speed than the core shaft. The gearbox is an epicyclic gearbox and has a sun gear, a plurality of planet gears, a ring gear, and a planet carrier. The planet carrier and the gearbox support each have a torsional stiffness, and a carrier to gearbox support torsional stiffness ratio is greater than or equal to 2.3.

20 Claims, 16 Drawing Sheets

(56) References Cited

U.S. PATENT DOCUMENTS

2019/0316488 A1 10/2019 Menczykalski et al.
2019/0345876 A1 11/2019 Goumas
2019/0368577 A1 12/2019 Ronchiato et al.

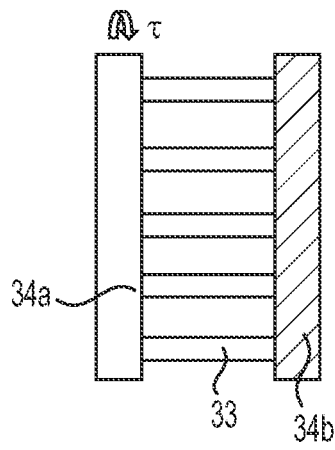 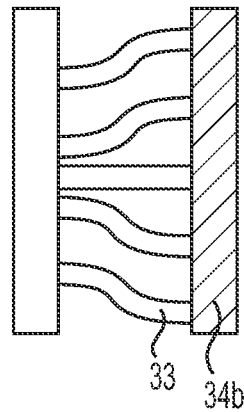
FIG. 12A  FIG. 12B
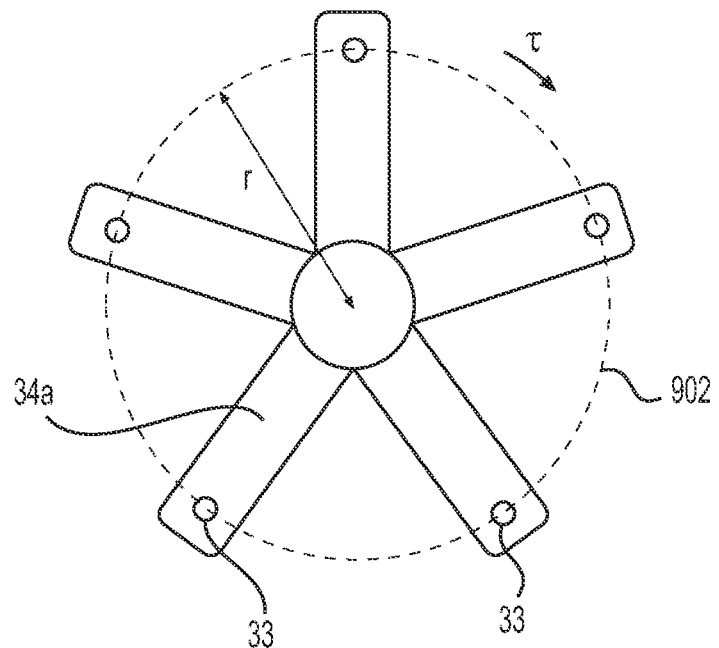
FIG. 13

RELIABLE GEARBOX FOR GAS TURBINE ENGINE

This application is a Continuation of application Ser. No. 17/161,004 filed Jan. 28, 2021, which is a continuation of application Ser. No. 16/807,744 filed Mar. 3, 2020, which is based upon and claims the benefit of priority from Great Britain Application No. 1917781.5 filed Dec. 5, 2019, the entire contents of the prior applications being incorporated herein by reference.

The present disclosure relates to gearboxes for use in aircraft engines, to aircraft engines comprising such a gearbox, and to methods of operating such an aircraft. Such gearboxes may be epicyclic gearboxes comprising a planet carrier having stiffnesses meeting specified criteria.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance extending in a radial direction in a radial plane, or a distance extending in an axial direction in an axial plane, respectively.

According to a first aspect there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. The radial bending stiffness of the planet carrier is equal to or greater than $1.20 \times 10^9$ N/m.

The radial bending stiffness of the planet carrier may be less than or equal to $1.00 \times 10^{12}$ N/m.

The radial bending stiffness of the planet carrier may be equal to or greater than $2.0 \times 10^9$ N/m, and/or optionally in the range from $1.20 \times 10^9$ to $1.00 \times 10^{12}$ N/m or from $2.0 \times 10^9$ to $1.5 \times 10^{11}$ N/m.

The tilt stiffness of the planet carrier may be greater than or equal to $6.00 \times 10^8$ Nm/radian, and optionally may be in the range from $1.3 \times 10^9$ to $1.2 \times 10^{11}$ Nm/radian.

The fan may have a fan diameter in the range from 240 to 280 cm. In such embodiments, the radial bending stiffness of the planet carrier may be equal to or greater than $1.5 \times 10^9$ N/m, and optionally less than or equal to $5 \times 10^{10}$ N/m.

Alternatively, the fan may have a fan diameter in the range from 330 to 380 cm. In such embodiments, the radial bending stiffness of the planet carrier may be equal to or greater than $2.0 \times 10^9$ N/m, and optionally less than or equal to $1.6 \times 10^{11}$ N/m.

According to a second aspect, there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. The tilt stiffness of the planet carrier is greater than or equal to $6.0 \times 10^8$ Nm/rad.

The tilt stiffness of the planet carrier may be less than or equal to $2.8 \times 10^{11}$ Nm/rad.

Optionally, the tilt stiffness of the planet carrier may be greater than or equal to $1.3 \times 10^9$ Nm/radian, and optionally in the range from $1.3 \times 10^9$ to $1.2 \times 10^{11}$ Nm/radian.

The radial bending stiffness of the planet carrier may be equal to or greater than $1.20 \times 10^9$ N/m, and optionally in the range from $1.20 \times 10^9$ to $1 \times 10^{12}$ N/m or from $2.0 \times 10^9$ to $1.5 \times 10^{11}$ N/m.

The fan may have a fan diameter in the range from 240 to 280 cm. In such embodiments, the tilt stiffness of the planet carrier may be greater than or equal to $2.2 \times 10^9$ Nm/radian, and optionally less than or equal to $1.4 \times 10^{11}$ Nm/radian.

Alternatively, the fan may have a fan diameter in the range from 330 to 380 cm. In such embodiments, the tilt stiffness of the planet carrier may be greater than or equal to $2.3 \times 10^9$ Nm/radian, and optionally less than or equal to $2.8 \times 10^{11}$ Nm/radian.

According to a third aspect, there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. The torsional stiffness of the planet carrier is greater than or equal to $1.60 \times 10^8$ Nm/rad, and optionally smaller than or equal to $1.00 \times 10^{11}$ Nm/rad.

The inventor has discovered that maintaining one or more stiffnesses of the carrier in the ranges claimed herein may allow for compensation in gear misalignment (for example due to variation within manufacturing tolerances and/or wear during operation) whilst avoiding significant distortion of the gearbox. The compensation may result in reduced variability in the loading across and/or between gears (e.g. a more even load share). In turn this may allow the mass of the gears to be reduced whilst still retaining the required life and efficiency for an aircraft application One or more stiffnesses of the carrier may therefore be selected to be relatively high to reduce or avoid deleterious wind-up or distortion of the carrier and/or misalignment of the gears carried by the carrier. It may be beneficial for the one or more of the stiffnesses to remain low enough to allow sufficient flexibility to correct for any minor gear misalignment due to manufacturing issues. The inventor discovered that in some arrangements maintaining one or more of the stiffnesses within the corresponding specified ranges provides a beneficial combination of these effects.

It has been found that maintaining an even distribution of load between the planet gears is desirable to improve gearbox lifetime and reliability. The inventor discovered that maintaining one or more of the carrier stiffnesses within the applicable specified range allows sufficient flexibility of the carrier to facilitate obtaining a more even load share (i.e. an improved load-share factor) by allowing the planet gears to move relative to each other and/or relative to the carrier. In some arrangements, if the carrier stiffness were too high, load-share factor may deteriorate due to an inability to accommodate any pre-existing misalignment, or any misalignment arising during use.

The carrier design of various embodiments, with one or more stiffnesses as defined, may therefore facilitate obtaining and/or maintaining correct gear alignment.

One or more of the following features may apply to any of the preceding three aspects:

The torsional stiffness of the planet carrier may be greater than or equal to $1.60 \times 10^8$ Nm/rad, and optionally in the range from $1.60 \times 10^8$ to $1.00 \times 10^{11}$ Nm/rad, or from $2.7 \times 10^8$ to $1 \times 10^{10}$ Nm/rad.

A pitch circle diameter of pins on which the planet gears are mounted may be in the range from 0.38 to 0.65 m, and optionally may be equal to 0.4 m or 0.55 m.

According to a fourth aspect, there is provided a method of operation of a gas turbine engine for an aircraft comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted, and wherein the radial bending stiffness of the planet carrier is equal to or greater than $1.20 \times 10^9$ N/m, and optionally less than or equal to $1.00 \times 10^{12}$ N/m. The method comprises operating the gas turbine engine to provide propulsion under cruise conditions.

According to a fifth aspect, there is provided a method of operation of a gas turbine engine for an aircraft comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted, and wherein the tilt stiffness of the planet carrier is greater than or equal to $6.0 \times 10^8$ Nm/rad. Additionally or alternatively, in a further aspect, the torsional stiffness of the planet carrier may be greater than or equal to $1.60 \times 10^8$ Nm/rad, and optionally less than or equal to $1.00 \times 10^{11}$ Nm/rad. The method comprises operating the gas turbine engine to provide propulsion under cruise conditions.

The method of the fourth or fifth aspect may comprise driving the gearbox with an input torque of:
(i) greater than or equal to 10,000 Nm, and optionally of 10,000 to 50,000 Nm at cruise; and/or
(ii) greater than or equal to 28,000 Nm, and optionally of 28,000 to 135,000 Nm at MTO.

According to a sixth aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from a core shaft driven by the power unit and to output drive to the fan so as to drive the fan at a lower rotational speed than the core shaft, and comprises a sun gear, a plurality of planet gears, a ring gear, and a planet carrier on which the planet gears are mounted. The radial bending stiffness of the planet carrier is equal to or greater than $1.20 \times 10^9$ N/m. Optionally, the radial bending stiffness of the planet carrier may be less than or equal to $1.00 \times 10^{12}$ N/m.

According to a seventh aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from the core shaft and to output drive to the fan so as to drive the fan at a lower rotational speed than the core shaft, and comprises a sun gear, a plurality of planet gears, a ring gear, and a planet carrier on which the planet gears are mounted. The tilt stiffness of the planet carrier is greater than or equal to $6.00 \times 10^8$ Nm/rad. The tilt stiffness of the planet carrier may be less than or equal to $2.8 \times 10^{11}$ Nm/rad.

Additionally or alternatively, in a further aspect, the torsional stiffness of the planet carrier may be greater than or equal to $1.60 \times 10^8$ Nm/rad, and optionally smaller than or equal to $1.00 \times 10^{11}$ Nm/rad.

The propulsor of the sixth or seventh aspect may have any or all of the features as described for the gas turbine engine of the first, second, and/or third aspect.

According to an eighth aspect there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. A radial bending to torsional carrier stiffness ratio of:

$$\frac{\text{the radial bending stiffness of the planet carrier}}{\text{the effective linear torsional stiffness of the planet carrier}}$$

is greater than or equal to 0.030.

The radial bending to torsional carrier stiffness ratio may be less than or equal to $2.0 \times 10^0$ (i.e. 2.0).

The radial bending to torsional carrier stiffness ratio may be in the range from in the range from 0.030 to 2.0, and optionally in the range from 0.060 to 1.0.

The radial bending stiffness of the planet carrier may be equal to or greater than $1.20 \times 10^9$ N/m, and optionally in the range from $1.20 \times 10^9$ to $1.00 \times 10^{12}$ N/m or from $2.0 \times 10^9$ to $1.5 \times 10^{11}$ N/m.

The effective linear torsional stiffness of the planet carrier may be greater than or equal to $7.00 \times 10^9$ N/m, and optionally in the range from $7.00 \times 10^9$ to $1.20 \times 10^{11}$ N/m or from $9.1 \times 10^9$ to $8.0 \times 10^{10}$ N/m.

The tilt stiffness of the planet carrier may be greater than or equal to $6.00 \times 10^8$ Nm/radian, and optionally in the range from $1.3 \times 10^9$ to $1.2 \times 10^{11}$ Nm/radian.

The radial bending to torsional carrier stiffness ratio may be in the range from 0.060 to 0.30. Alternatively, the radial bending to torsional carrier stiffness ratio may be in the range from 0.30 to 2.0.

A tilt to torsional carrier stiffness ratio of:

$$\frac{\text{the tilt stiffness of the planet carrier}}{\text{the torsional stiffness of the planet carrier}}$$

may be in the range from 0.7 to 20.

According to a ninth aspect, there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. A tilt to torsional carrier stiffness ratio of:

$$\frac{\text{the tilt stiffness of the planet carrier}}{\text{the torsional stiffness of the planet carrier}}$$

is in the range from 0.7 to 20.

The tilt to torsional carrier stiffness ratio may be in the range from 0.7 to 7.3.

The tilt stiffness of the planet carrier may be greater than or equal to $6.00 \times 10^8$ Nm/radian, and optionally in the range from $1.3 \times 10^9$ to $1.2 \times 10^{11}$ Nm/radian.

The radial bending stiffness of the planet carrier may be equal to or greater than $1.20 \times 10^9$ N/m, and optionally in the range from $1.20 \times 10^9$ to $1 \times 10^{12}$ N/m or from $2.0 \times 10^9$ to $1.5 \times 10^{11}$ N/m.

The torsional stiffness of the planet carrier may be greater than or equal to $1.60 \times 10^8$ Nm/radian, and optionally in the range from $1.60 \times 10^8$ to $1.00 \times 10^{11}$ Nm/radian, or from $2.7 \times 10^8$ to $1 \times 10^{10}$ Nm/radian.

The fan may have a fan diameter in the range from 240 to 280 cm. In such embodiments, the tilt to torsional carrier stiffness ratio may be in the range from 2.5 to 8.0.

Alternatively, the fan may have a fan diameter in the range from 330 to 380 cm. In such embodiments, the tilt to torsional carrier stiffness ratio may be in the range from 1.5 to 7.9.

A radial bending to torsional carrier stiffness ratio of:

$$\frac{\text{the radial bending stiffness of the planet carrier}}{\text{the effective linear torsional stiffness of the planet carrier}}$$

may be in the range from 0.030 to 2.0.

The inventor discovered that maintaining the ratio of the radial bending or tilt stiffness of the carrier to the torsional stiffness of the carrier within the specified range allows for improved avoidance of damage to gear teeth (due to a relative increase in the carrier torsional stiffness). Any further relative increase of the torsional stiffness was found not to provide further benefits in tooth protection, and may instead risk reducing overall performance by adding unnecessary size and/or weight to the carrier. The torsional stiffness of the carrier is therefore arranged to be relatively high to reduce or avoid the risk of distortion of gear teeth. In particular, the inventor appreciated that wind-up of the carrier whilst the gear teeth are meshed may chip, grind or deform gear teeth as they are forced against teeth of the opposing gear.

According to a tenth aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted. A radial bending to torsional carrier stiffness ratio of:

$$\frac{\text{the radial bending stiffness of the planet carrier}}{\text{the effective linear torsional stiffness of the planet carrier}}$$

is in the range from 0.030 to 2.0. Additionally or alternatively, a tilt to torsional carrier stiffness ratio of:

$$\frac{\text{the tilt stiffness of the planet carrier}}{\text{the torsional stiffness of the planet carrier}}$$

is in the range from 0.7 to 20.

The method comprises operating the gas turbine engine to provide propulsion under cruise conditions.

The method may comprise driving the gearbox with an input torque of greater than or equal to 10,000 Nm, and optionally of 10,000 to 50,000 Nm at cruise.

The method may comprise driving the gearbox with an input torque of greater than or equal to 28,000 Nm, and optionally of 28,000 to 135,000 Nm at MTO.

The engine used for the method of the tenth aspect may have any or all of the features of the engine of the eighth or ninth aspects.

According to an eleventh aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from the core shaft and to output drive to the fan so as to drive the fan at a lower rotational speed than the core shaft, and comprises a sun gear, a plurality of planet gears, a ring gear, and a planet carrier on which the planet gears are mounted. A radial bending to torsional carrier stiffness ratio of:

$$\frac{\text{the radial bending stiffness of the planet carrier}}{\text{the effective linear torsional stiffness of the planet carrier}}$$

is in the range from 0.030 to 2.0.

According to a twelfth aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from the core shaft and to output drive to the fan so as to drive the fan at a lower rotational speed than the core shaft, and comprises a sun gear, a plurality of planet gears, a ring gear, and a planet carrier on which the planet gears are mounted. A tilt to torsional carrier stiffness ratio of:

$$\frac{\text{the tilt stiffness of the planet carrier}}{\text{the torsional stiffness of the planet carrier}}$$

is in the range from 0.7 to 20.

The propulsor of the eleventh or twelfth aspect may have any or all of the features of the engine of the eighth or ninth aspects.

According to a thirteenth aspect there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted. A carrier to gearbox input shaft torsional stiffness ratio of:

$$\frac{\text{the torsional stiffness of the planet carrier}}{\text{the torsional stiffness of the gearbox input shaft}}$$

is greater than or equal to 70, and optionally less than or equal to $5.0 \times 10^3$.

The inventor has discovered that the torsional stiffness of a gearbox system—including in particular the gearbox input shaft and the carrier—should be distributed in the claimed proportion because keeping the torsional stiffness of the carrier relatively high was found to reduce or avoid the risk of distortion of gear teeth as described above, but relatively increasing the torsional stiffness of the core shaft (the input shaft to the gearbox) did not improve this effect, but rather deleteriously added size and/or weight to the shaft without a corresponding benefit.

Whilst torsional flexibility of the gearbox input shaft may have less of an effect on gearbox performance than carrier flexibility, the skilled person would appreciate that too low a gearbox input shaft torsional stiffness may result in wind-up of the sun gear, potentially resulting in gear misalignments. Relative increases in gearbox input shaft stiffness beyond the claimed ratio range may provide no further benefit, and may instead unnecessarily increase size and/or weight of the fan shaft.

The carrier to gearbox input shaft torsional stiffness ratio may be equal to or greater than 75, and optionally in the range from $7.5 \times 10^1$ to $3 \times 10^3$.

The torsional stiffness of the planet carrier may be greater than or equal to $1.60 \times 10^8$ Nm/rad, and optionally in the range from $1.60 \times 10^8$ to $1.00 \times 10^{11}$ Nm/rad, or from $2.7 \times 10^8$ to $1 \times 10^{10}$ Nm/rad The torsional stiffness of the gearbox input shaft may be equal to or greater than $1.4 \times 10^6$ Nm/radian, and optionally in the range from $1.4 \times 10^6$ to $2.5 \times 10^8$ Nm/radian.

The fan may have a fan diameter in the range from 240 to 280 cm. In such embodiments, the carrier to gearbox input shaft torsional stiffness ratio may be greater than or equal to $7.3 \times 10^1$, and optionally less than or equal to $1.0 \times 10^3$.

The fan may have a fan diameter in the range from 330 to 380 cm. In such embodiments, the carrier to gearbox input shaft torsional stiffness ratio may be greater than or equal to $1.0 \times 10^2$, and optionally less than or equal to $5.0 \times 10^3$.

The gas turbine engine may further comprise a gearbox support arranged to support the gearbox in a fixed position within the engine and having a torsional stiffness. A carrier to gearbox support torsional stiffness ratio of:

$$\frac{\text{the torsional stiffness of the planet carrier}}{\text{the torsional stiffness of the gearbox input shaft}}$$

may be greater than or equal to 2.3, and optionally greater than or equal to 2.6.

The gas turbine engine may further comprise a fan shaft that connects an output of the gearbox to the fan. A carrier to fan shaft stiffness ratio of:

$$\frac{\text{the torsional stiffness of the planet carrier}}{\text{the torsional stiffness of the fan shaft}}$$

may be greater than or equal to 8, and optionally greater than or equal to 9.

The product of the torsional stiffness of the planet carrier and the torsional stiffness of the gearbox input shaft may be greater than or equal to $1.5 \times 10^{14}$ N$^2$m$^2$rad$^{-2}$, and optionally greater than or equal to $2.2 \times 10^{14}$ N$^2$m$^2$rad$^{-2}$.

The fan may have a fan diameter in the range from 240 to 280 cm and the product of the torsional stiffness of the planet carrier and the torsional stiffness of the gearbox input shaft may be greater than or equal to $1.5 \times 10^{14}$ N$^2$m$^2$rad$^{-2}$.

The fan may have a fan diameter in the range from 330 to 380 cm and the product of the torsional stiffness of the planet carrier and the torsional stiffness of the gearbox input shaft may be greater than or equal to $3.0 \times 10^{15}$ N$^2$m$^2$rad$^{-2}$.

The gearbox may be a star gearbox, in which the planet carrier does not rotate in use.

A pitch circle diameter of pins on which the planet gears are mounted may be in the range from 0.38 to 0.65 m, and optionally may be equal to 0.4 m or 0.55 m.

According to a fourteenth aspect, there is provided a method of operation of a gas turbine engine for an aircraft comprising: an engine core comprising a turbine, a compressor, and a core shaft connecting the turbine to the compressor; a fan located upstream of the engine core, the fan comprising a plurality of fan blades; and a gearbox arranged to receive an input from a gearbox input shaft portion of the core shaft and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted.

A carrier to gearbox input shaft torsional stiffness ratio of:

$$\frac{\text{the torsional stiffness of the planet carrier}}{\text{the torsional stiffness of the gearbox input shaft}}$$

is greater than or equal to 70. The method comprises operating the gas turbine engine to provide propulsion under cruise conditions. The carrier to gearbox input shaft torsional stiffness ratio may be less than or equal to 5,000.

The method may comprise driving the gearbox with an input torque of greater than or equal to 10,000 Nm, and optionally of 10,000 to 50,000 Nm at cruise.

The method may comprise driving the gearbox with an input torque of greater than or equal to 28,000 Nm, and optionally of 28,000 to 135,000 Nm at MTO.

According to a fifteenth aspect, there is provided a propulsor for an aircraft, the propulsor comprising: a fan comprising a plurality of fan blades; a gearbox; and a power unit for driving the fan via the gearbox. The gearbox is an epicyclic gearbox arranged to receive an input from a gearbox input shaft portion of a core shaft driven by the power unit and to output drive to the fan so as to drive the fan at a lower rotational speed than the core shaft, and comprises a sun gear, a plurality of planet gears, a ring gear, and a planet carrier on which the planet gears are mounted. A carrier to gearbox input shaft torsional stiffness ratio of:

$$\frac{\text{the torsional stiffness of the planet carrier}}{\text{the torsional stiffness of the gearbox input shaft}}$$

is greater than or equal to 70. The carrier to gearbox input shaft torsional stiffness ratio may be less than or equal to 5,000.

The propulsor may have some or all of the features described above with respect to the gas turbine engine, and may be a gas turbine engine in some embodiments.

In various other aspects of the invention, the specified boundaries on the carrier to gearbox input shaft torsional stiffness ratio may be replaced by, or provided in addition to, specified boundaries on the product of the components of the carrier to gearbox input shaft torsional stiffness ratio, i.e. boundaries on the torsional stiffness of the planet carrier multiplied by the torsional stiffness of the gearbox input shaft. The value of this product, in various aspects, may be greater than or equal to $1.5 \times 10^{14}$ N$^2$m$^2$rad$^{-2}$, and optionally less than $1.0 \times 10^{17}$ N$^2$m$^2$rad$^{-2}$. Optionally, the value may be greater than or equal to $2.2 \times 10^{14}$ N$^2$m$^2$rad$^{-2}$, and optionally less than $5.0 \times 10^{16}$ N$^2$m$^2$rad$^{-2}$.

For example, according to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted. The torsional stiffness of the planet carrier multiplied by the torsional stiffness of the gearbox input shaft is greater than or equal to $1.5 \times 10^{14}$ N$^2$m$^2$rad$^{-2}$.

The skilled person would appreciate that method and propulsor aspects may be formulated accordingly. The optional features of the aspects for the corresponding ratio may also apply to these aspects.

According to a sixteenth aspect, there is provided a gas turbine engine for an aircraft, the engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a gearbox support arranged to support the gearbox in a fixed position within the engine and having a torsional stiffness. A carrier to gearbox support torsional stiffness ratio of:

$$\frac{\text{the torsional stiffness of the planet carrier}}{\text{the torsional stiffness of the gearbox support}}$$

is greater than or equal to 2.3. The carrier to gearbox support torsional stiffness ratio may be less than or equal to 300.

The inventor has discovered that the torsional stiffness of a gearbox system—including in particular the gearbox support and the carrier—should be distributed in the claimed proportion to provide improvements such as those described above with respect to the thirteenth aspect. In particular, the inventor discovered that maintaining the ratio within the specified range allowed for a reduced risk of gear tooth damage whilst still maintaining sufficient stiffness to avoid damagingly large amplitudes of torsional vibration modes of the gearbox support.

The carrier to gearbox support torsional stiffness ratio may be greater than or equal to 2.6, and optionally in the range from 2.6 to 50.

The torsional stiffness of the planet carrier may be greater than or equal to $1.60 \times 10^8$ Nm/rad, and optionally in the range from $1.60 \times 10^8$ to $1.00 \times 10^{11}$ Nm/rad, or from $2.7 \times 10^8$ to $1 \times 10^{10}$ Nm/rad.

The torsional stiffness of the gearbox input shaft portion of the core shaft may be greater than or equal to $1.4 \times 10^6$ Nm/radian, and optionally greater than or equal to $1.6 \times 10^6$ Nm/radian.

The fan may have a fan diameter in the range from 240 to 280 cm, and the carrier to gearbox support torsional stiffness ratio may be greater than or equal to 2.3.

The fan may have a fan diameter in the range from 330 to 380 cm, and the carrier to gearbox support torsional stiffness ratio may be greater than or equal to 3.5.

The torsional stiffness of the planet carrier multiplied by the torsional stiffness of the gearbox may be greater than or equal to $5 \times 10^{15}$ N$^2$m$^2$rad$^{-2}$, and optionally less than $1.0 \times 10^{19}$ N$^2$m$^2$rad$^{-2}$.

The core shaft may comprise a gearbox input shaft portion arranged to provide the input to the gearbox. A carrier to gearbox input shaft torsional stiffness ratio of:

$$\frac{\text{the torsional stiffness of the planet carrier}}{\text{the torsional stiffness of the gearbox input shaft}}$$

may be greater than or equal to 70.

The carrier to gearbox input shaft torsional stiffness ratio may be equal to or greater than 75, and optionally in the range from $7.5 \times 10^1$ to $3 \times 10^3$.

The gearbox may be a star gearbox, in which the planet carrier does not rotate in use.

A pitch circle diameter of pins on which the planet gears are mounted may be in the range from 0.38 to 0.65 m, and optionally may be equal to 0.4 m or 0.55 m.

The gas turbine engine may further comprise a fan shaft that connects an output of the gearbox to the fan. A carrier to fan shaft stiffness ratio of:

$$\frac{\text{the torsional stiffness of the planet carrier}}{\text{the torsional stiffness of the fan shaft}}$$

may be greater than or equal to 8, and optionally greater than or equal to 9, and may be less than or equal to 1,100.

According to a seventeenth aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft. The gearbox is an epicyclic gearbox comprising a sun gear, a plurality of planet gears, a ring gear, and a planet carrier on which the planet gears are mounted; and a gearbox support arranged to support the gearbox in a fixed position within the engine and having a torsional stiffness. A carrier to gearbox support torsional stiffness ratio of:

$$\frac{\text{the torsional stiffness of the planet carrier}}{\text{the torsional stiffness of the gearbox support}}$$

is greater than or equal to 2.3. The method comprises operating the gas turbine engine to provide propulsion under cruise conditions. The carrier to gearbox support torsional stiffness ratio may be less than or equal to 300.

The method may further comprise driving the gearbox with an input torque of greater than or equal to 10,000 Nm, and optionally of 10,000 to 50,000 Nm at cruise.

The method may further comprise driving the gearbox with an input torque of greater than or equal to 28,000 Nm, and optionally of 28,000 to 135,000 Nm at MTO.

According to an eighteenth aspect, there is provided a propulsor for an aircraft, the propulsor comprising: a fan comprising a plurality of fan blades; a gearbox; and a power unit for driving the fan via the gearbox. The gearbox is arranged to receive an input from a core shaft driven by the power unit and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted. The propulsor further comprises a gearbox support arranged to support the gearbox in a fixed position within the propulsor and having a torsional stiffness. A carrier to gearbox support torsional stiffness ratio of:

$$\frac{\text{the torsional stiffness of the planet carrier}}{\text{the torsional stiffness of the gearbox support}}$$

is greater than or equal to 2.3, and optionally less than or equal to 300.

The propulsor may have some or all of the features described above with respect to the gas turbine engine, and may be a gas turbine engine in some embodiments.

In various other aspects of the invention, the specified boundaries on the carrier to gearbox support torsional stiffness ratio may be replaced by, or provided in addition to, specified boundaries on the product of the components of the carrier to gearbox support torsional stiffness ratio, i.e. boundaries on the torsional stiffness of the planet carrier multiplied by the torsional stiffness of the gearbox support. The value of this product, in various aspects, may be greater than or equal to $5\times10^{15}$ $N^2m^2rad^{-2}$, and optionally less than $1.0\times10^{19}$ $N^2m^2rad^{-2}$. Optionally, the value may be greater than or equal to $8.0\times10^{15}$ $N^2m^2rad^{-2}$, and optionally less than $2.0\times10^{18}$ $N^2m^2rad^{-2}$.

For example, according to another aspect, there is provided a gas turbine engine for an aircraft, the engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a gearbox support arranged to support the gearbox in a fixed position within the engine and having a torsional stiffness. A torsional stiffness of the planet carrier multiplied by a torsional stiffness of the gearbox support is greater than or equal to $5\times10^{15}$ $N^2m^2rad^{-2}$.

The skilled person would appreciate that method and propulsor aspects may be formulated accordingly. The optional features of the aspects for the corresponding ratio may also apply to these aspects.

According to a nineteenth aspect, there is provided a gas turbine engine for an aircraft, the engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a fan shaft that connects an output of the gearbox to the fan. A carrier to fan shaft stiffness ratio of:

$$\frac{\text{the torsional stiffness of the planet carrier}}{\text{the torsional stiffness of the fan shaft}}$$

is greater than or equal to 8. The carrier to fan shaft stiffness ratio may be less than or equal to 1,100.

The inventor has discovered that the torsional stiffness of a gearbox system—including in particular the carrier and the gearbox output shaft (fan shaft)—should be distributed in the claimed proportion to provide improvements such as those described above with respect to the thirteenth and sixteenth aspects. In particular, the inventor discovered that maintaining the ratio within the specified range allowed for a reduced risk of gear tooth damage whilst still maintaining sufficient stiffness of the fan shaft to avoid damagingly large displacements of gears within the gearbox.

The skilled person would appreciate that too low a fan shaft stiffness may result in wind-up of the carrier (for a planetary gearbox) or of the ring gear (for a star gearbox), resulting in gear misalignments. Relative increases in fan shaft stiffness beyond the claimed ratio range may provide no further benefit, however, and may instead deleteriously increase size and/or weight of the fan shaft.

The carrier to fan shaft torsional stiffness ratio may be greater than or equal to 9, and optionally in the range from 9 to $1.9\times10^2$.

The fan shaft may comprise two shaft portions; a gearbox output shaft portion extending from the gearbox and a fan portion extending between the gearbox output shaft portion and the fan.

The torsional stiffness of the planet carrier may be greater than or equal to $1.60\times10^8$ Nm/rad, and optionally in the range from $1.60\times10^8$ to $1.00\times10^{11}$ Nm/rad, or from $2.7\times10^8$ to $1\times10^{10}$ Nm/radian.

The torsional stiffness of the gearbox input shaft portion of the core shaft may be greater than or equal to $1.4\times10^6$ Nm/radian, and optionally greater than or equal to $1.6\times10^6$ Nm/radian.

The fan may have a fan diameter in the range from 240 to 280 cm, and the carrier to fan shaft torsional stiffness ratio may be greater than or equal to 9.

The fan may have a fan diameter in the range from 330 to 380 cm, and the carrier to fan shaft torsional stiffness ratio may be greater than or equal to 12.

The gearbox may be a star gearbox, in which the planet carrier does not rotate in use.

A pitch circle diameter of pins on which the planet gears are mounted may be in the range from 0.38 to 0.65 m, and optionally may be equal to 0.4 m or 0.55 m.

The gas turbine engine may further comprise a gearbox support arranged to support the gearbox in a fixed position within the engine and having a torsional stiffness. A carrier to gearbox support torsional stiffness ratio of:

$$\frac{\text{the torsional stiffness of the planet carrier}}{\text{the torsional stiffness of the gearbox support}}$$

may be greater than or equal to 2.3, and optionally greater than or equal to 2.6.

The carrier to gearbox support torsional stiffness ratio may be in the range from 2.3 to 300, and optionally from 2.6 to 50.

The core shaft may comprise a gearbox input shaft portion arranged to provide the input to the gearbox. A carrier to gearbox input shaft torsional stiffness ratio of:

$$\frac{\text{the torsional stiffness of the planet carrier}}{\text{the torsional stiffness of the gearbox input shaft}}$$

may be greater than or equal to 70, and optionally less than or equal to 5,000.

The carrier to gearbox input shaft torsional stiffness ratio may be equal to or greater than 75, and optionally in the range from $7.5 \times 10^1$ to $3 \times 10^3$.

According to a twentieth aspect, there is provided a method of operation of a gas turbine engine for an aircraft, the engine comprising: an engine core comprising a turbine, a compressor, and a core shaft connecting the turbine to the compressor; a fan located upstream of the engine core, the fan comprising a plurality of fan blades. The engine core further comprises a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a fan shaft that connects an output of the gearbox to the fan. A carrier to fan shaft stiffness ratio of:

$$\frac{\text{the torsional stiffness of the planet carrier}}{\text{the torsional stiffness of the fan shaft}}$$

is greater than or equal to 8, and optionally may be less than or equal to 1,100.

The method comprises operating the gas turbine engine to provide propulsion under cruise conditions.

The method may further comprise driving the gearbox with an input torque of greater than or equal to 10,000 Nm, and optionally of 10,000 to 50,000 Nm at cruise.

The method may further comprise driving the gearbox with an input torque of greater than or equal to 28,000 Nm, and optionally of 28,000 to 135,000 Nm at MTO.

The engine may be as described in the nineteenth aspect.

According to a twenty-first aspect, there is provided a propulsor for an aircraft, the propulsor comprising: a fan comprising a plurality of fan blades; a gearbox; and a power unit for driving the fan via the gearbox. The gearbox is arranged to receive an input from a core shaft driven by the power unit and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a fan shaft that connects an output of the gearbox to the fan. A carrier to fan shaft stiffness ratio of:

$$\frac{\text{the torsional stiffness of the planet carrier}}{\text{the torsional stiffness of the fan shaft}}$$

is greater than or equal to 8, and optionally may be less than or equal to 1,100.

The propulsor may have some or all of the features described above with respect to the gas turbine engine, and may be a gas turbine engine in some embodiments.

In various other aspects of the invention, the specified boundaries on the carrier to fan shaft stiffness ratio may be replaced by, or provided in addition to, specified boundaries on the product of the components of the carrier to fan shaft stiffness ratio, i.e. boundaries on the torsional stiffness of the planet carrier multiplied by the torsional stiffness of the fan shaft. The value of this product, in various aspects, may be greater than or equal to $1.5 \times 10^{15}$ N$^2$m$^2$rad$^{-2}$, and optionally less than $3.0 \times 10^{18}$ N$^2$m$^2$rad$^{-2}$. Optionally, the value may be greater than or equal to $2.0 \times 10^{15}$ N$^2$m$^2$rad$^{-2}$, and optionally less than $7.0 \times 10^{17}$ N$^2$m$^2$rad$^{-2}$.

For example, according to another aspect, there is provided a gas turbine engine for an aircraft, the engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the planet gears are mounted; and a fan shaft that connects an output of the gearbox to the fan. The torsional stiffness of the planet carrier multiplied by the torsional stiffness of the fan shaft is greater than or equal to $1.5 \times 10^{15}$ N$^2$m$^2$rad$^{-2}$.

The skilled person would appreciate that method and propulsor aspects may be formulated accordingly. The optional features of the aspects for the corresponding ratio may also apply to these aspects.

According to a twenty-second aspect, there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier comprising a plurality of pins, each pin being arranged to have a planet gear of the plurality of planet gears mounted thereon. A first carrier to pin stiffness ratio of:

$$\frac{\text{the effective linear torsional stiffness of the planet carrier}}{\text{the radial bending stiffness of each pin}}$$

is greater than or equal to 10. The first carrier to pin stiffness ratio may be less than or equal to 40.

The first carrier to pin stiffness ratio may be greater than or equal to 15, and optionally in the range from 15 to 30.

The effective linear torsional stiffness of the planet carrier may be greater than or equal to $7.00 \times 10^9$ N/m, and optionally in the range from $7.00 \times 10^9$ to $1.20 \times 10^{11}$ N/m or from $9.1 \times 10^9$ to $8.0 \times 10^{10}$ N/m.

The radial bending stiffness of each pin may be greater than or equal to $3.00 \times 10^8$ N/m, and optionally greater than or equal to $6.3 \times 10^8$ N/m.

A second carrier to pin stiffness ratio of:

$$\frac{\text{the torsional stiffness of the planet carrier}}{\text{the tilt stiffness of each pin}}$$

is greater than or equal to 24, and optionally greater than or equal to 34, and optionally less than or equal to 180.

The fan may have a fan diameter in the range from 240 to 280 cm. In such embodiments, the first carrier to pin stiffness ratio may be greater than or equal to 15, and optionally in the range from 15 to 25. Alternatively, the fan may have a fan diameter in the range from 330 to 380 cm. In such embodiments, the first carrier to pin stiffness ratio may be greater than or equal to 16, and optionally in the range from 16 to 35.

According to a twenty-third aspect, there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier comprising a plurality of pins, each pin being arranged to have a planet gear of the plurality of planet gears mounted thereon. A second carrier to pin stiffness ratio of:

$$\frac{\text{the torsional stiffness of the planet carrier}}{\text{the tilt stiffness of each pin}}$$

is greater than or equal to 24, and optionally may be less than or equal to 180.

The second carrier to pin stiffness ratio may be greater than or equal to 34, and optionally in the range from 34 to 140.

The torsional stiffness of the planet carrier may be greater than or equal to $1.60 \times 10^8$ Nm/rad, and optionally may be in the range from $1.60 \times 10^8$ to $1.00 \times 10^{11}$ Nm/rad, or from $2.7 \times 10^8$ to $1 \times 10^{10}$ Nm/rad.

The tilt stiffness of each pin may be greater than or equal to $4.0 \times 10^6$ Nm/rad, and optionally may be greater than or equal to $8.7 \times 10^6$ Nm/rad.

A first carrier to pin stiffness ratio of:

$$\frac{\text{the effective linear torsional stiffness of the planet carrier}}{\text{the radial bending stiffness of each pin}}$$

may be greater than or equal to 10 or 15.

The first carrier to pin stiffness ratio may be less than or equal to 40, and optionally in the range from 15 to 30.

The fan may have a fan diameter in the range from 240 to 280 cm. In such embodiments, the second carrier to pin stiffness ratio may be greater than or equal to 34, and optionally in the range from 34 to 120.

Alternatively, the fan may have a fan diameter in the range from 330 to 380 cm. In such embodiments, the second carrier to pin stiffness ratio may be greater than or equal to 40, and optionally in the range from 40 to 180.

The inventor has discovered that the torsional stiffness of the carrier and the radial bending and/or tilt stiffness of each pin of the carrier should be selected to match the claimed relationship so as to improve engine longevity and/or efficiency, for example by protecting gear teeth and/or improving planet load sharing.

The torsional stiffness of the carrier is therefore arranged to be relatively high as compared to the radial bending and/or tilt stiffness of each individual pin, to reduce or avoid the risk of distortion of gear teeth as described above whilst also reducing the differential load/improving load-share. Further, the inventor discovered that the pin tilt stiffness may have a more significant effect than the pin radial bending stiffness—excess tilt deflections of the pin may be more damaging than radial bending deflections for the same magnitude of deflection as tilt deflections may produce two compounding effects—firstly, load share may worsen, with some planet gears taking a larger share of the load than others, and secondly face distribution of that load shifts. The larger force on a particular planet gear is therefore concentrated on one side of the gear rather than equally distributed across the tooth. The increased load on that gear and the increased concentration of that load may therefore damage the gear teeth. Maintaining the pin tilt stiffness above $4.0 \times 10^6$ Nm/rad, and optionally above $8.7 \times 10^6$ Nm/rad or $1.4 \times 10^7$ Nm/rad may therefore be of particular importance in some embodiments.

Relatively increasing the torsional stiffness of the carrier outside of the specified relationship may provide diminishing returns, or indeed negatively affect performance, due to the unnecessary size and/or weight of the stiffer carrier negating performance gains from reducing wind-up.

Each pin may have a soft connection to the carrier. The soft connection may be provided by one or more of a portion of the pin, a portion of the carrier, and/or a separate component. The soft connection may be classed as a part of the pin for the purposes of assessing pin stiffness.

According to a twenty-fourth aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted.

A first carrier to pin stiffness ratio of:

$$\frac{\text{the effective linear torsional stiffness of the planet carrier}}{\text{the radial bending stiffness of each pin}}$$

is greater than or equal to 10, and optionally greater than or equal to 15 (and/or optionally less than or equal to 40); or a second carrier to pin stiffness ratio of:

$$\frac{\text{the torsional stiffness of the planet carrier}}{\text{the tilt stiffness of each pin}}$$

is greater than or equal to 24 (and optionally less than or equal to 180).

The method comprises operating the gas turbine engine to provide propulsion under cruise conditions. The engine may be as described in the twenty-second or twenty-third aspects.

The method may comprise driving the gearbox with an input torque of:
(i) greater than or equal to 10,000 Nm, and optionally of 10,000 to 50,000 Nm at cruise; and/or
(ii) greater than or equal to 28,000 Nm, and optionally of 28,000 to 135,000 Nm at Maximum Take-Off.

According to a twenty-fifth aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from a core shaft driven by the power unit and to output drive to the fan so as to drive the fan at a lower rotational speed than the core shaft, and comprises a sun gear, a plurality of planet gears, a ring gear, and a planet carrier on which the planet gears are mounted. A first carrier to pin stiffness ratio of:

$$\frac{\text{the effective linear torsional stiffness of the planet carrier}}{\text{the radial bending stiffness of each pin}}$$

is greater than or equal to 10, and optionally less than or equal to 40.

According to a twenty-sixth aspect, there is provided a propulsor for an aircraft, the propulsor comprising a fan comprising a plurality of fan blades; a gearbox; and a power unit for driving the fan via the gearbox. The gearbox is an epicyclic gearbox arranged to receive an input from a core shaft driven by the power unit and to output drive to the fan so as to drive the fan at a lower rotational speed than the core shaft, and comprises a sun gear, a plurality of planet gears, a ring gear, and a planet carrier on which the planet gears are mounted. A second carrier to pin stiffness ratio of:

$$\frac{\text{the torsional stiffness of the planet carrier}}{\text{the tilt stiffness of each pin}}$$

is greater than or equal to 24, and optionally less than or equal to 180.

The propulsor may have some or all of the features described above with respect to the gas turbine engine, and may be a gas turbine engine in some embodiments.

In various other aspects of the invention, the specified boundaries on the first and second carrier to pin stiffness ratios may be replaced by, or provided in addition to, specified boundaries on the product of the components of the respective stiffness ratio, i.e. boundaries on the torsional stiffness of the planet carrier multiplied by the tilt stiffness of a pin, or on the effective linear torsional stiffness of a pin. The value of this product for the first carrier to pin stiffness ratio (i.e. the effective linear torsional stiffness of the planet carrier multiplied by the pin radial bending stiffness), in various aspects, may be greater than or equal to $2.1 \times 10^{18}$ $N^2 m^{-2}$, and optionally less than $3.6 \times 10^{20}$ $N^2 m^{-2}$. Optionally, the value may be greater than or equal to $5.8 \times 10^{18}$ $N^2 m^{-2}$, and optionally less than $1.7 \times 10^{20}$ $N^2 m^{-2}$. The value of this product for the second carrier to pin stiffness ratio 9 i.e. the torsional stiffness of the planet carrier multiplied by the pin tilt stiffness), in various aspects, may be greater than or equal to $1.0 \times 10^{15}$ $N^2 m^2 rad^{-2}$, and optionally less than $4.7 \times 10^{17}$ $N^2 m^2 rad^{-2}$. Optionally, the value may be greater than or equal to $2.5 \times 10^{15}$ $N^2 m^2 rad^{-2}$, and optionally less than $2.0 \times 10^{17}$ $N^2 m^2 rad^{-2}$.

The skilled person would appreciate that gas turbine engine, method and propulsor aspects may be formulated accordingly. The optional features of the aspects for the corresponding ratio may also apply to these aspects.

In any of the preceding aspects, any one or more of the following may apply as applicable:

The turbine may be a first turbine, the compressor a first compressor, and the core shaft a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The planet carrier may comprise a forward plate and a rearward plate and pins extending therebetween. Each pin may be arranged to have a planet gear mounted thereon. The planet carrier may further comprise lugs extending between the forward and rearward plates, the lugs being arranged to pass between adjacent planet gears.

The gearbox may comprise an odd number of planet gears, and optionally may comprise 3, 5 or 7 planet gears.

The fan may have a fan diameter greater than 240 cm and less than or equal to 380 cm, and optionally greater than 300 cm and less than or equal to 380 cm.

The gearbox input shaft may provide a soft mounting for the sun gear such that some movement of the sun gear is facilitated. The core shaft may comprise a more stiff section and a less stiff section, the less stiff section providing the gearbox input shaft and being arranged to lie between the more stiff section and the sun gear and being arranged to provide, or to contribute to, the soft mounting of the sun gear.

A gear ratio of the gearbox may be in any range disclosed herein, for example in the range from 3.2 to 4.5, and optionally from 3.3 to 4.0.

A specific thrust of the engine at cruise may be in the range from 70 to 90 $NKg^{-1}s$.

A bypass ratio at cruise may be in the range from 12.5 to 18; and optionally from 13 to 16.

For any parameter or ratio of parameters X claimed or disclosed herein, a limit on the values that X can take that is expressed as "X is greater than or equal to Y" can alternatively be expressed as "1/X is less than or equal to 1/Y". Any of the ratios or parameters defined in the aspects and statements above may therefore be expressed as "1/X is less than or equal to 1/Y" rather than "X is greater than or equal to Y". Zero may be taken as the lower bound on the value of 1/X.

Various parameters of the gearbox, and/or of the engine more generally, may be adjusted to allow the engine to meet the specifications of the various aspects summarised above. Comments on various such parameters are provided below, with further examples of ways in which these may be adjusted provided later in the description of the components.

One or more of gearbox size, gearbox geometry (including presence or absence of lugs in the carrier, and the number, size, and/or shape of any lugs present), and material choice, amongst other factors, may be selected or adjusted to achieve a desired carrier stiffness. The materials of which the carrier is made (often steels) may, for example, have a Young's modulus in the range from 100 to 250 GPa, or 105 to 215 GPa, and optionally around 210 GPa—different grades of steel, or other types of metal, may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments.

Flexibility of the carrier (effectively the inverse of stiffness) allows changes in alignment of the gears and bearings—the inventor appreciated that a certain amount of flexibility in some places may advantageously allow manufacturing misalignments to be corrected in use, that a certain misalignment may be tolerated, and that a larger misalignment could deleteriously affect running of the engine, and discovered various stiffness relationships to capture the advantages of appropriate stiffness ranges.

One or more of material choice, pin geometry (e.g. diameter), pin mounting design, and internal pin structure (e.g. solid or hollow) may be selected or adjusted to achieve a desired pin stiffness. Pin materials may often be steels (often with a Young's modulus of 100 to 250 GPa, and optionally around 210 GPa) and one or more different steel grades may be selected to adjust stiffness.

Some flexibility of the pins may be provided to allow correction of planet misalignment, but too much flexibility may create damaging misalignments. Increasing pin stiffness too far may result in excessive size and/or weight reducing overall performance.

Turning to the gearbox input shaft, the inventor has discovered that the torsional stiffness of the gearbox input shaft has an effect on the torsional stiffness of the whole transmission, but a relatively minimal effect on gearbox operation as torsional deflection results in wind up only, and no misalignment of gears. The gearbox input shaft may therefore have a lower torsional stiffness than the carrier without deleterious effects.

Similar considerations may apply to the fan shaft (the gearbox output shaft).

The inventor realised that decreasing the torsional stiffnesses of the shafts below the ranges defined herein may result in deleterious torsion vibrations at low modal frequencies (the skilled person would appreciate that the lower modal frequency whirl modes have larger amplitudes/deflections than the higher modes, and so are more important to avoid), whilst increasing the torsional stiffness above the ranges defined herein may result in excessive size and/or weight of the shaft without a corresponding improvement in performance. One or more of shaft diameter, material(s), and wall thickness may be adjusted so as to obtain shaft stiffnesses in the desired ranges.

Turning to gearbox size, and in particular to ring gear pitch circle diameter (PCD) as a measure of gearbox size, the inventor appreciated that an optimal PCD may be selected by considering the relationship between improved performance due to improved use of the lever effect for larger gearbox sizes, and the effect of increased drag for larger gearbox sizes (diminishing returns on the improved lever effect from the larger size above a certain PCD, and increased size and weight of the larger size). Ring gear materials may be selected to ensure that a maximum expected torque density for the PCD size would be well within tolerance limits.

One or more of gearbox support material(s) and geometry may be adjusted to achieve a desired torsional stiffness. The inventor appreciated that gearbox support torsional stiffness may be selected to be high enough to suppress torque ripple effects, so maintaining gearbox movements within acceptable bounds, whilst avoiding the addition of unnecessary size and/or weight.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter.

Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust (for example maximum throttle) for the engine at International Standard Atmosphere (ISA) sea level pressure and temperature +15° C. with a fan inlet velocity of 0.25 Mn.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number (Mn) of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

Whilst in the arrangements described herein the source of drive for the propulsive fan is provided by a gas turbine engine, the skilled person will appreciate the applicability of the gearbox configurations disclosed herein to other forms of aircraft propulsor comprising alternative drive types. For example, the above-mentioned gearbox arrangements may be utilised in aircraft propulsors comprising a propulsive fan driven by an electric motor. In such circumstances, the electric motor may be configured to operate at higher rotational speeds and thus may have a lower rotor diameter and may be more power-dense. The gearbox configurations of the aforesaid aspects may be employed to reduce the rotational input speed for the fan or propeller to allow it to operate in a more favourable efficiency regime. Thus, according to an aspect, there is provided an electric propulsion unit for an aircraft, comprising an electric machine configured to drive a propulsive fan via a gearbox, the gearbox and/or its inputs/outputs/supports being as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

FIGS. 12A and 12B are schematic diagrams illustrating torsional stiffness of the carrier in side view;

FIG. 13 is a schematic diagram illustrating torsional stiffness of an alternative carrier in front view;

Figure 21A:
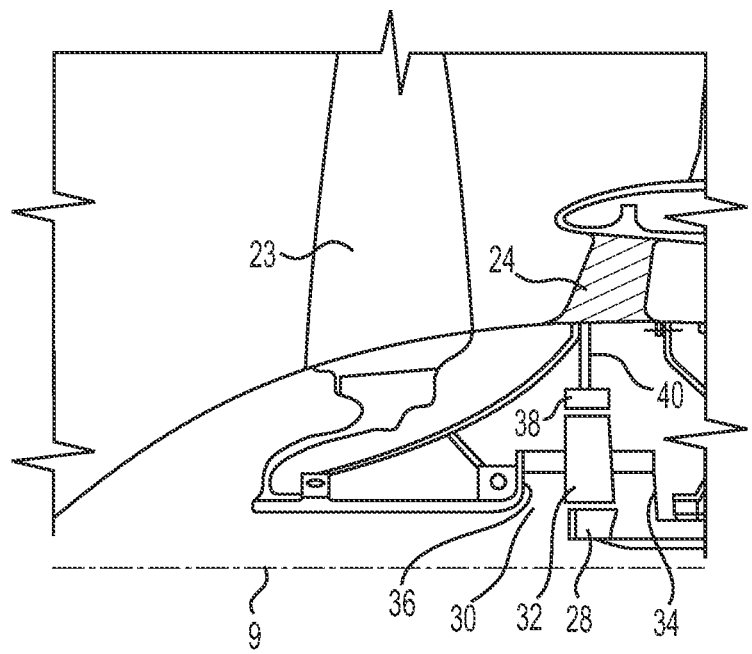
Figure 21B:
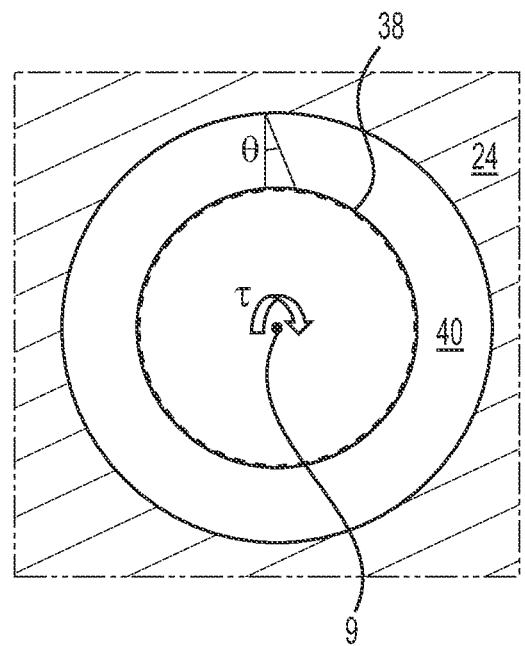
Figure 22:
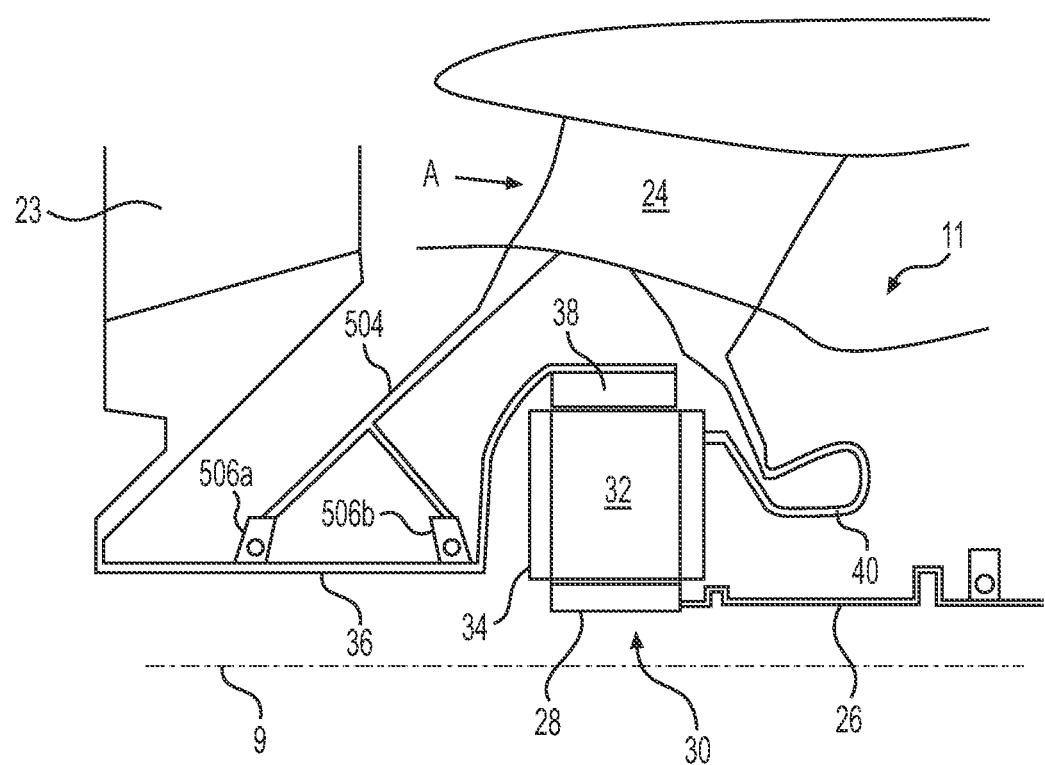
Figure 23:
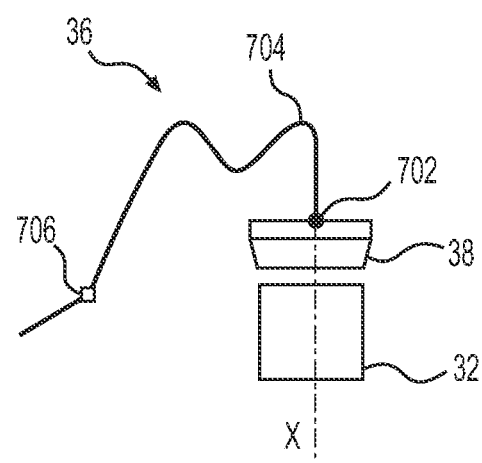
Figure 24:
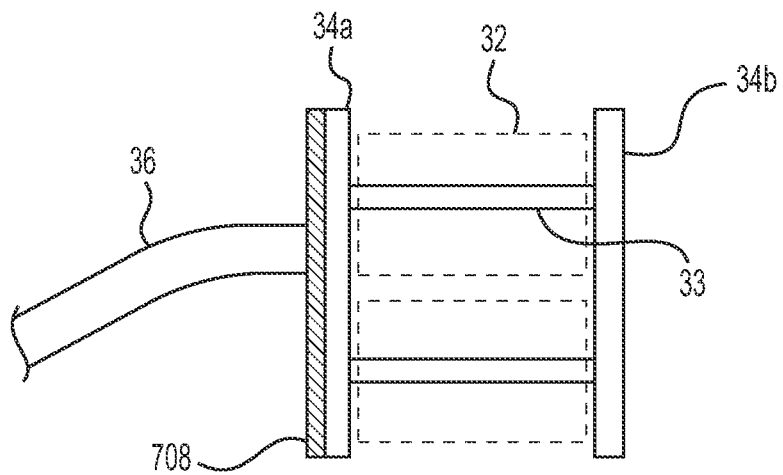
Figure 25:
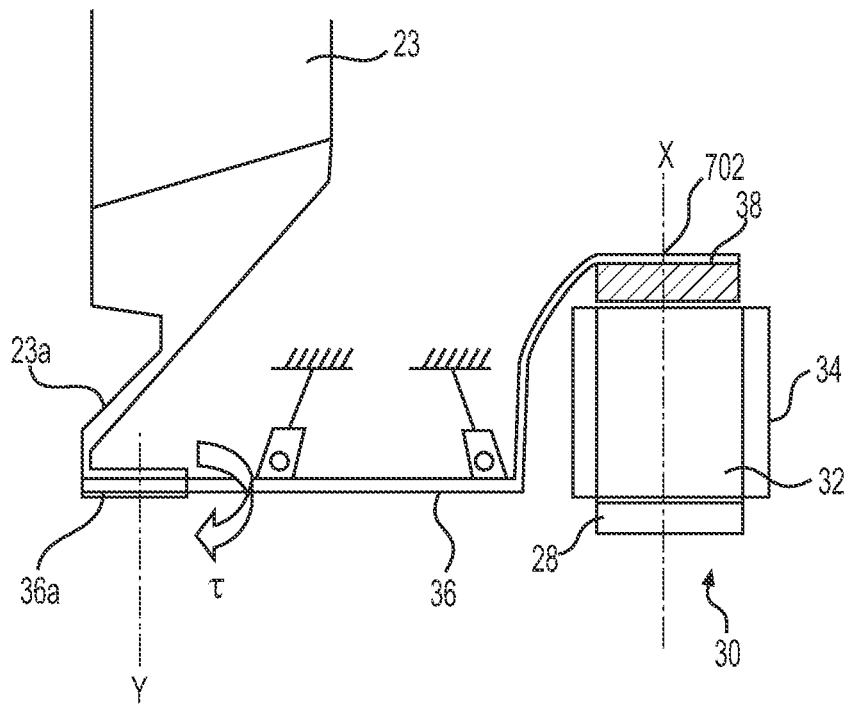
Figure 26:
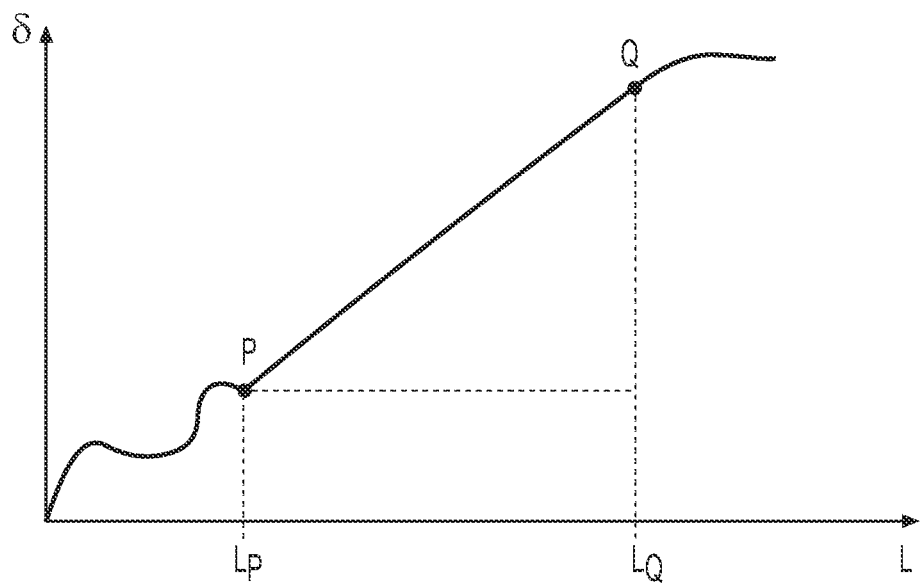
Figure 27:
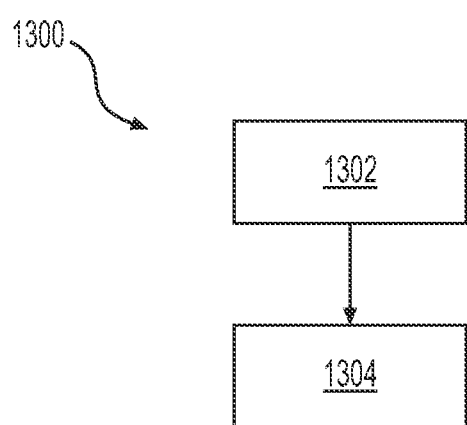

FIGS. 21A and 21B include side and radial views of the gearbox support illustrating torsional stiffness of the gearbox support;

FIG. 22 is a schematic diagram illustrating a portion of an engine with a star gearbox;

FIG. 23 is a schematic diagram illustrating connection of the fan shaft to a star gearbox;

FIG. 24 is a schematic diagram illustrating connection of the fan shaft to a planetary gearbox;

FIG. 25 is a schematic diagram illustrating fan shaft torsional stiffness in an engine with a star gearbox;

FIG. 26 is a graph of displacement against load, illustrating an elastic region within which stiffnesses of components may be determined; and FIG. 27 illustrates a method.

Figure 1:
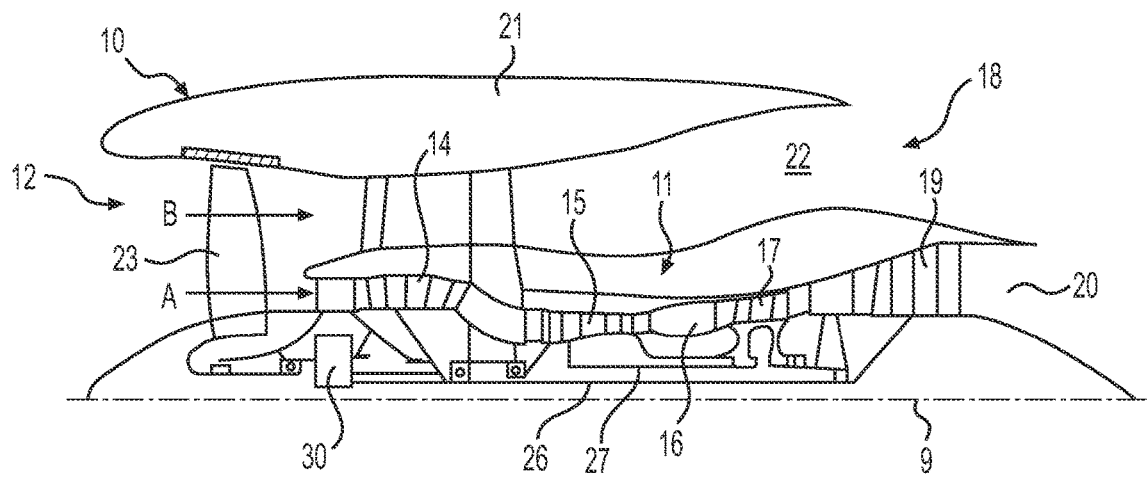
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
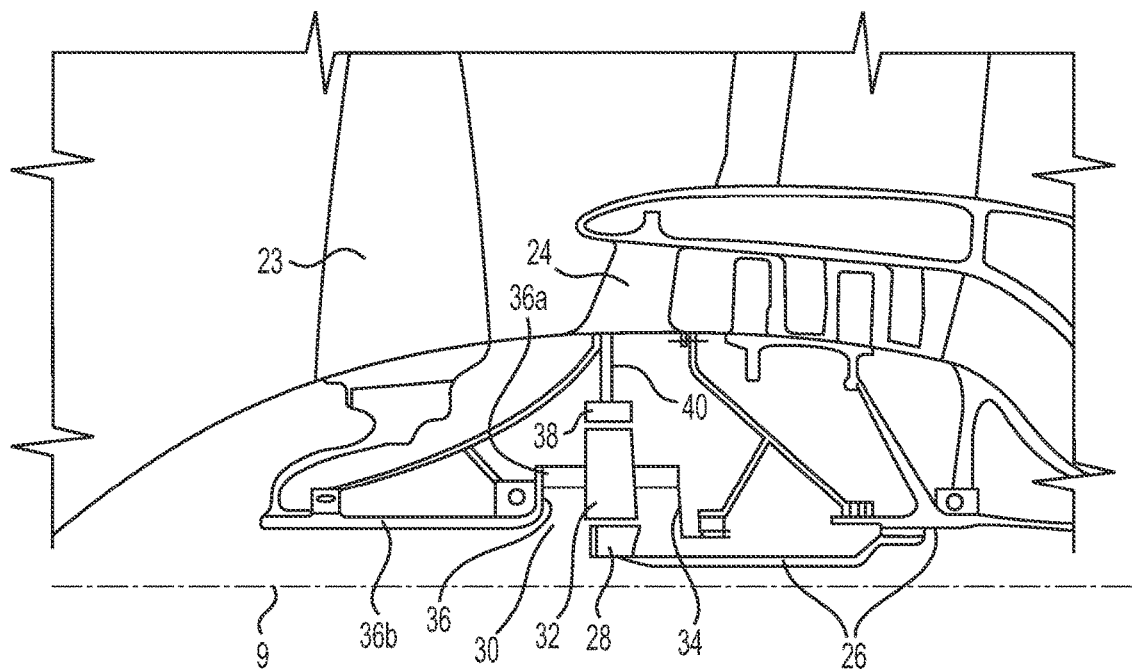
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The linkages 36 may be referred to as a fan shaft 36, the fan shaft 36 optionally comprising two or more shaft portions coupled together. For example, the fan shaft 36 may comprise a gearbox output shaft portion 36a extending from the gearbox 30 and a fan portion 36b extending between the gearbox output shaft portion and the fan 23. In the embodiment shown in FIGS. 1 and 2, the gearbox 30 is a planetary gearbox and the gearbox output shaft portion 36a is connected to the planet carrier 34—it may therefore be referred to as a carrier output shaft 36a. In star gearboxes 30, the gearbox output shaft portion 36a may be connected to the ring gear 38—it may therefore be referred to as a ring output shaft 36a. In the embodiment shown in FIGS. 1 and 2, the fan portion 36b of the fan shaft 36 connects the gearbox output shaft portion 36a to the fan 23. The output of the gearbox 30 is therefore transferred to the fan 23, to rotate the fan, via the fan shaft 36. In alternative embodiments, the fan shaft 36 may comprise a single component, or more than two components. Unless otherwise indicated or apparent to the skilled person, anything described with respect to an engine 10 with a star gearbox 30 may equally be applied to an engine with a planetary gearbox 30, and vice versa.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
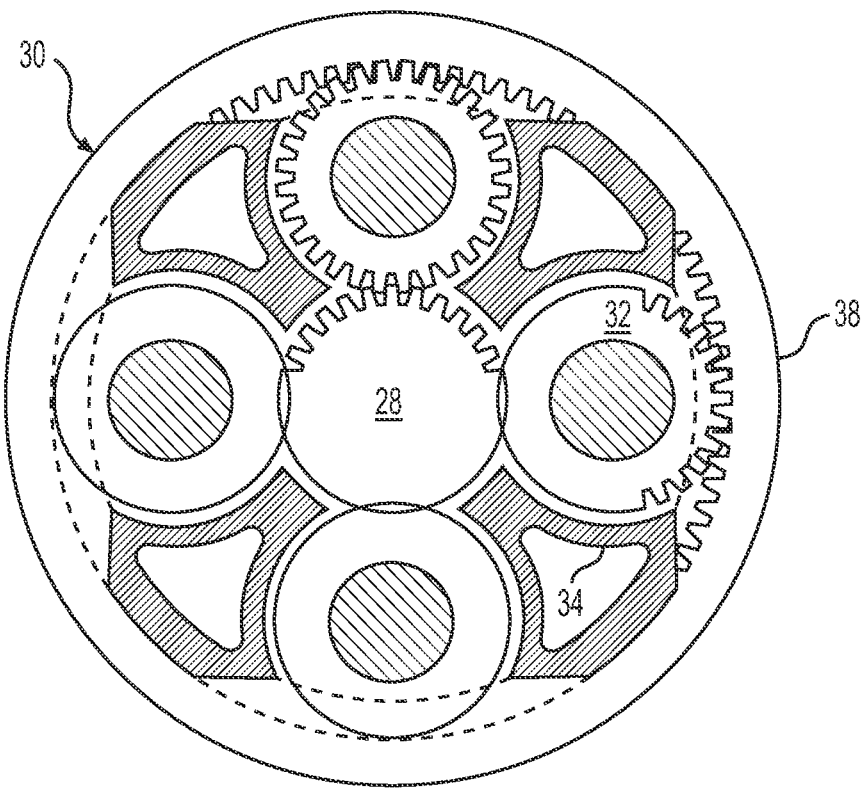
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular. In the described arrangement, the carrier 34 comprises two plates 34a, 34b; in particular a forward plate 34a and a rearward plate 34b (see, for example, FIGS. 9A to 9C). Each plate 34a, 34b extends in a radial plane, with the forward plate 34a lying further forward in the engine 10/closer to the fan 23 than the rearward plate 34b.

The carrier 34 may take any suitable form. For example, the carrier may or may not be symmetric about its axial mid-point. Purely by way example, in a described arrangement, the carrier 34 is not symmetric about its axial mid-point, but rather the rearward plate 34b is stiffer than the forward plate 34a (for example by 50 to 300%) to compensate for an asymmetric torque variation across the gearbox 30. In some embodiments, no forward plate 34a may be provided, or only a smaller forward plate 34a. In some embodiments, the plates 34a, 34b of the carrier 34 may have equal stiffnesses (for example, in various planetary gearbox arrangements; stiffer rearward plates 34b may be preferred in some star gearbox arrangements).

A plurality of pins 33 extend across the carrier 34 (between the forward and rearward plates 34a,b in the arrangement being described), as shown, for example, in FIGS. 9 to 18. The pins 33 form a part of the carrier 34. Each pin 33 has a planet gear 32 mounted thereon. As referred to herein, reference to a planet gear 32 includes the gear 32 mounted on the pin 33 regardless of whether the gearbox is a so-called "star" arrangement (such as that shown in FIG. 22), or a "planetary gearbox" (such as that shown in FIG. 2).

The carrier stiffness in a region at each of the front and rear ends of each pin 33 may be arranged to be relatively low in the embodiments being described, to facilitate a more even load distribution; i.e. to improve load-share factor. This may be described as soft mountings for each pin 33. The soft mountings 33a, 33b may allow some movement of the pins 33 relative to each other, and relative to the carrier plates 34a, 34b, so allowing differences between planet gears 34, or other manufacturing defects, to be accommodated without a significant difference in load between different planet gears 34.

Such soft mountings 34a, 34b may be provided by a portion of the pin 33, by a separate component, and/or by a portion of the respective carrier plate 34a, 34b, in various embodiments. The soft mountings 34a, 34b may be designed to accommodate movements to address one or more of carrier bearing location accuracy and clearance, planet pin runout of bearing surface to mounting feature(s), planet gear teeth to bearing runout, planet gear teeth spacing and thickness variation/manufacturing tolerances, sun gear teeth spacing and thickness variation/manufacturing tolerances, and/or gearbox input shaft mainline bearing location accuracy and clearance, or the likes. For example, in various embodiments the soft mountings 34a, 34b may be arranged to allow around 500 μm of pin movement.

Pin size, design and/or material may be adjusted to provide appropriate stiffnesses to the carrier 34.

Figure 15:
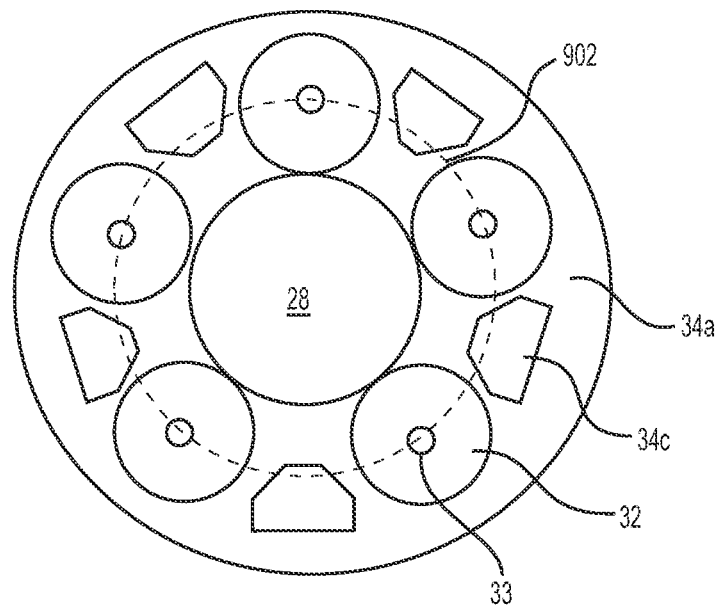
FIG. 15 is a schematic diagram illustrating a front view of a carrier comprising lugs.

In some arrangements, such as that shown in FIG. 15, lugs 34c may be provided, extending between the carrier plates 34a, 34b and past the planet gears 32. The presence/absence of lugs 34c, and the number, shape, and/or material(s) of the lug(s) may vary in various embodiments, and may be adjusted to provide appropriate stiffnesses to the carrier 34.

Figure 4:
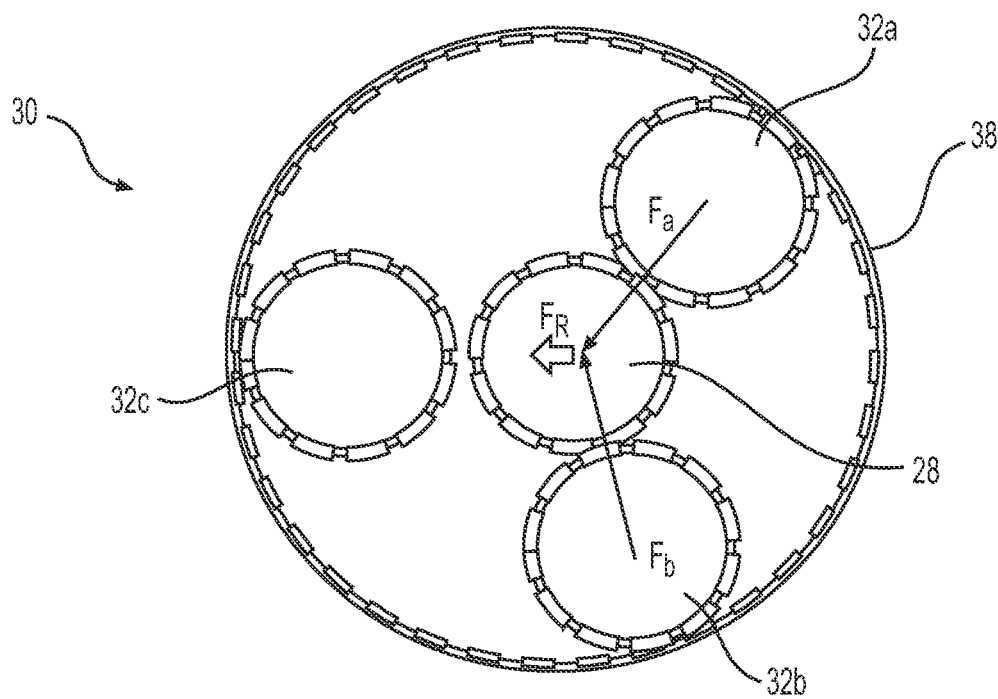
FIG. 4 is a schematic diagram illustrating automatic load-share adjustments within a gearbox.

Use of flexibility within the gearbox 30 to improve load-share is illustrated schematically in FIG. 4, which shows a planetary gearbox 30 with three planet gears 32a, 32b, 32c (misalignments are exaggerated in this Figure for clarity of explanation). In this example, the sun gear 28 is slightly off-centre with respect to the ring gear 38, and in particular is closer to two planet gears 32a and 32b than it is to the third planet gear 32c. In the schematic example shown, there is no contact between the third planet gear 32c and the sun gear 28, leaving the other two planet gears 32a, 32b to take 50% of the load each, rather than one third each as would be expected for an even load distribution. This relatively extreme example is provided for ease of reference only—in reality, situations in which contact with one planet gear 32c is reduced, but not completely eliminated, would be more likely, for example leading to a percentage load-share of 20:40:40, 26:37:37, or 31:34:34 or the likes rather than the ideal even load share fraction of ⅓:⅓:⅓ (i.e. 33:33:33, as a percentage load share, rounded to the nearest integer).

In the example shown in FIG. 4, each of the two planet gears 32a, 32b in contact with the sun gear 28 exerts a force $F_a$, $F_b$ on the sun gear 28. The resultant force, $F_R$, on the sun gear 28 pushes the sun gear 28 towards the third planet gear 32c, so re-establishing contact and making the load-share between planets 32 more even. A soft mounting of the sun gear 28/flexibility in the core input shaft 26 facilitates this re-balancing. Such a soft mounting of the sun gear 28 may be designed to accommodate movements to address one or more of carrier bearing location accuracy and clearance, planet and/or sun gear teeth spacing and thickness variation/manufacturing tolerances, and/or gearbox input shaft mainline bearing location accuracy and clearance, or the likes. For example, in various embodiments such soft mountings may be arranged to allow around 1000 μm of sun gear movement.

The skilled person would appreciate that a similar effect would apply if one of the planet gears 32 were closer to the sun gear 28 than the others; pushing the relevant planet gear 32 back towards the ring gear 38, or if one of the planet gears 32 were larger or smaller than the others. Soft mounting of the pins 33/flexibility in the carrier 34 facilitates this rebalancing. Small variations between planet gears 32 and/or misalignments of pins 33 or shafts 26 may therefore be accommodated by flexibility within the gearbox 30. Having an odd number of planet gears 32 (e.g. 3, 5 or 7 planet gears) may facilitate this automatic re-distribution of load-share, although even numbers of planet gears may be used in some arrangements.

The following general definitions of stiffnesses may be used herein:

Radial Bending Stiffness

Figure 5:
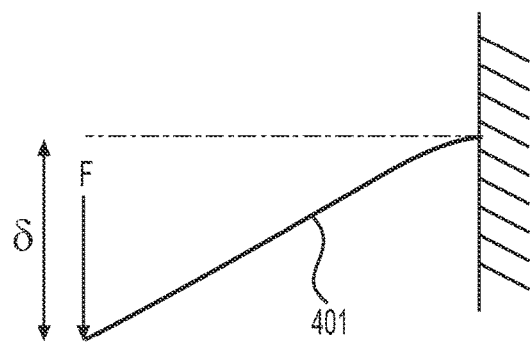
FIG. 5 is a schematic diagram illustrating radial bending stiffness of a cantilevered beam.

A radial bending stiffness is a measure of deformation caused by a given force applied in any one selected radial direction (i.e. any direction perpendicular to and passing through the engine axis). The radial bending stiffness is defined with reference to FIG. 5 in terms of the deformation of a cantilevered beam 401. As illustrated in FIG. 5, a force, F, applied at the free end of the beam in a direction perpendicular to the longitudinal axis of the beam causes a linear perpendicular deformation, $\delta$. The radial bending stiffness is the force applied for a given linear deformation i.e. $F/\delta$. In the present application, the radial bending stiffness is taken relative to the rotational axis of the engine 9, and so relates to the resistance to linear deformation in a radial direction of the engine caused by a radial force. The beam, or equivalent cantilevered component, extends along the axis of rotation of the engine, the force, F, is applied perpendicular to the axis of the engine, along any radial direction, and the displacement $\delta$ is measured perpendicular to the axis of rotation, along the line of action of the force. The radial bending stiffness as defined herein has SI units of N/m. In the present application, unless otherwise stated, the radial bending stiffness is taken to be a free-body stiffness i.e. stiffness measured for a component in isolation in a cantilever configuration, without other components present which may affect its stiffness. When the force is applied perpendicular to the cantilevered beam, and at the free end of the beam, the resultant curvature is not constant but rather increases towards the fixed end of the beam.

For some components, the beam may more appropriately be constrained to move in a particular way as is described in more detail for the specific example of pins 33 below.

Tilt Stiffness

Figure 6:
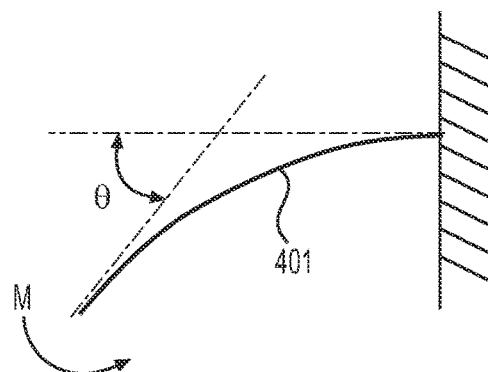
FIG. 6 is a schematic diagram illustrating tilt stiffness of a cantilevered beam.

A tilt stiffness is defined with reference to FIG. 6, which shows the resulting deformation of a cantilevered beam 401 under a moment, M, applied at its free end. The tilt stiffness is a measure of the resistance to rotation of a point on the component at which a moment is applied. As can be seen in FIG. 6, an applied moment at the free end of the cantilevered beam causes a constant curvature along the length of the beam between its free and fixed ends. The applied moment, M, causes a rotation $\theta$ of the point at which it is applied. The tilt stiffness as defined herein therefore has SI units of Nm/radian.

The tilt stiffness may be expressed as an effective linear tilt stiffness for a component having a given radius by expressing the tilt stiffness in terms of a pair of equal and opposite forces, F, acting at either end of that radius (rather than the moment) and the arc displacement at that radius (i.e. displacement measured along a circumference of a circle having that radius). An approximate or overall tilt angle, $\alpha$, may be defined for the purposes of calculating the effective linear stiffness. The arc displacement may be referred to as $r\alpha$. The effective linear tilt stiffness is given by the ratio of effective force divided by the displacement, $F/r\alpha$ and has the units N/m.

Torsional Stiffness

Figure 7:
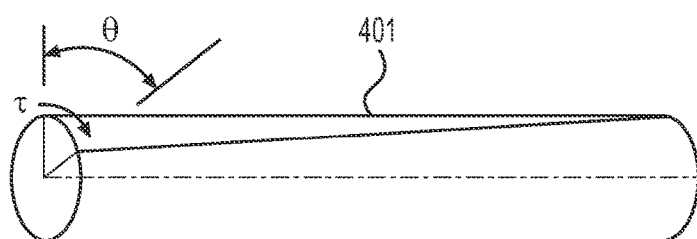
FIG. 7 is a schematic diagram illustrating torsional stiffness of a cantilevered beam.
Figure 8:
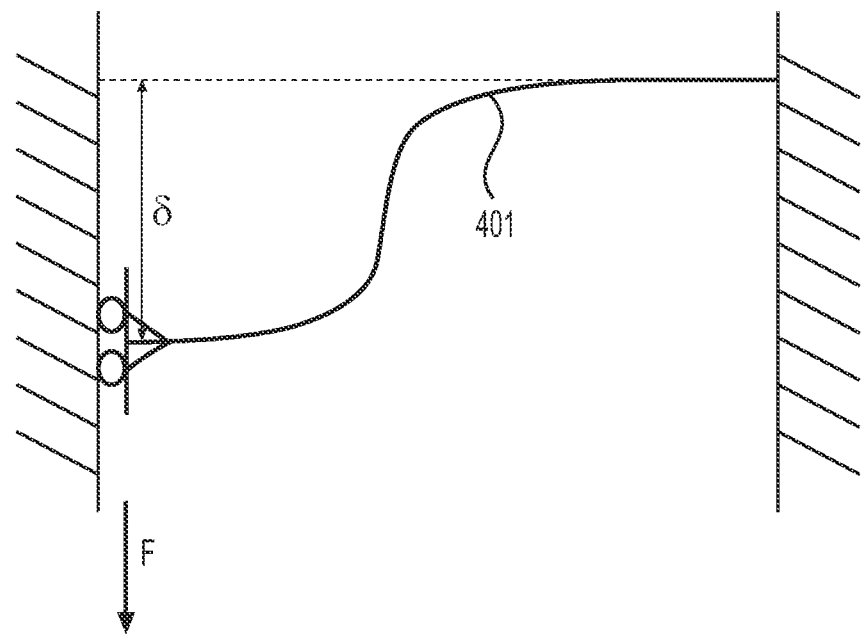
FIG. 8 is a schematic diagram illustrating radial bending stiffness of a cantilevered beam, with its moveable end slidably mounted on a plane.

FIG. 7 illustrates the definition of the torsional stiffness of a shaft 401 or other body. A torque, $\tau$, applied to the free end of the beam causes a rotational deformation, $\theta$ (e.g. twist) along the length of the beam. The torsional stiffness is the torque applied for a given angle of twist i.e. $\tau/\theta$. The torsional stiffness has SI units of Nm/rad.

An effective linear torsional stiffness may be determined for a component having a given radius. The effective linear torsional stiffness is defined in terms of an equivalent tangential force applied at a point on that radius (with magnitude of torque divided by the radius) and the distance $\delta$ (with magnitude of the radius multiplied by $\theta$) moved by a point corresponding to the rotational deformation $\theta$ of the component.

More specific definitions of stiffnesses relating to embodiments described herein are provided below for ease of understanding.

Carrier Stiffnesses

The planet carrier 34 holds the planet gears 32 in place. In various arrangements including the embodiment being described, the planet carrier 34 comprises a forward plate 34a and a rearward plate 34b, and pins 33 extending between the plates, as illustrated in FIGS. 9 to 17. The pins 33 are arranged to be parallel to the engine axis 9. In alternative embodiments, a plate 34b may be provided on only one side—no plate or only a partial plate may be provided on the other side of the carrier 34. In the embodiment shown in FIG. 15, the carrier 34 additionally comprises lugs 34c, which may also be referred to as wedges or a web, between the forward and rearward plates 34a, 34b. The lugs 34c may increase the overall stiffness of the carrier 34.

The stiffness of the carrier 34 is selected to be relatively high to react centrifugal forces and/or to maintain gear alignment. The skilled person would appreciate that stiffness is a measure of the displacement that results from any applied forces or moments, and may not relate to strength of the component. Hence to react a high load, any stiffness is acceptable so long as the resulting displacement is tolerable. How high a stiffness is desired to keep a displacement within acceptable limits therefore depends on position and orientation of the gears, which is generally referred to as gear alignment (or mis-alignment).

Carrier Radial Bending Stiffness

Figures 9A, 9B, 9C:
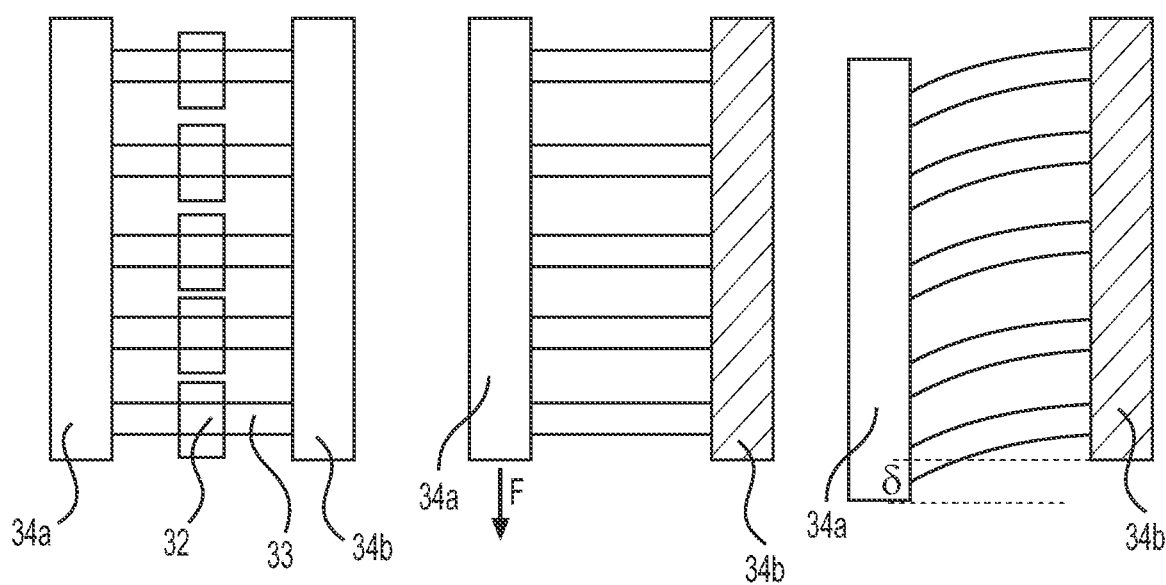
FIGS. 9A to 9C are schematic diagrams illustrating radial bending stiffness of the carrier.

In the embodiment being described, the carrier radial bending stiffness is determined treating the carrier 34 as a free-body fixedly mounted at one plate 34b, with a (radial) force, F, applied at the axial position of the axial centre point of the other plate 34a. This is illustrated in FIGS. 9A to 9C, with arrow F indicating the (radial) force on the plate 34a and $\delta$ illustrating the (radial) displacement of the plate 34a. The force, F, is shown acting along a line that passes through the engine axis 9. In embodiments with only one plate 34a, the ends of the pins 33 further from the single plate 34a are held in place instead.

In various embodiments, a radial bending stiffness of the carrier 34 may be equal to or greater than $1.20 \times 10^9$ N/m, and optionally equal to or greater than $2.0 \times 10^9$ N/m. In some embodiments, for example in embodiments in which the fan diameter is in the range from 240 to 280 cm, the radial bending stiffness of the carrier 34 may be equal to or greater than $1.5 \times 10^9$ N/m, and optionally may be equal to or greater than $2 \times 10^9$ N/m (and optionally may be equal to $2.30 \times 10^9$ or $3.85 \times 10^9$ N/m). In some embodiments, for example in embodiments in which the fan diameter is in the range from 330 to 380 cm, the radial bending stiffness of the carrier 34 may be equal to or greater than $2.0 \times 10^9$ N/m and optionally may be equal to or greater than $3 \times 10^9$ N/m (and optionally may be equal to $3.92 \times 10^9$ N/m or $7.70 \times 10^9$ N/m).

In various embodiments, the radial bending stiffness of the carrier 34 is in the range from $1.20 \times 10^9$ to $1 \times 10^{12}$ N/m, and optionally in the range from $2.0 \times 10^9$ to $1.5 \times 10^{11}$ N/m. In some embodiments, for example in embodiments in which the fan diameter is in the range from 240 to 280 cm, the radial bending stiffness of the carrier 34 may be in the range from $1.5 \times 10^9$ to $5 \times 10^{10}$ N/m, and optionally may be in the range from $2 \times 10^9$ to $5 \times 10^9$ N/m or from $1.9 \times 10^9$ to $2.7 \times 10^9$ N/m (and optionally may be equal to $3.85 \times 10^9$ N/m or to $2.30 \times 10^9$ N/m). In some embodiments, for example in embodiments in which the fan diameter is in the range from 330 to 380 cm, the radial bending stiffness of the carrier 34 may be in the range from $2.0 \times 10^9$ to $1.6 \times 10^{11}$ N/m and optionally may be in the range from $3.0 \times 10^9$ to $9.0 \times 10^9$ N/m (and optionally may be equal to $7.70 \times 10^9$ N/m or to $3.92 \times 10^9$ N/m).

The carrier 34 serves to locate the planet gears 32 within the gearbox 30 and to reduce or avoid misalignment. The skilled person would appreciate that the desired carrier stiffness may be obtained in various different ways, for example by adjusting one or more of carrier material(s) and carrier geometry as appropriate. For a given material, the stiffness may be a function of carrier and gearbox size, and gearbox configuration, for example. Planet gear number and gearbox ratio may also be adjusted to arrive at the desired stiffness. For example, the gear ratio of the gearbox 30 may be changed, so causing the planet gear spacing, and in some cases the number of planet gears 32, to change. The change in planet gear spacing may provide more (or less) space for lugs 34c between the gears 32, and the sizes and shapes of these lugs 34c may be adjusted to achieve the desired carrier stiffness.

Carrier Tilt Stiffness

Figure 10A:
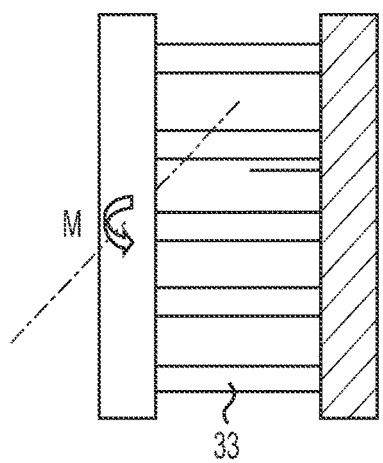
FIGS. 10A to 10D are schematic diagrams illustrating tilt stiffness of the carrier, and more specifically the determination of an effective linear tilt stiffness for the carrier.
Figure 10B:
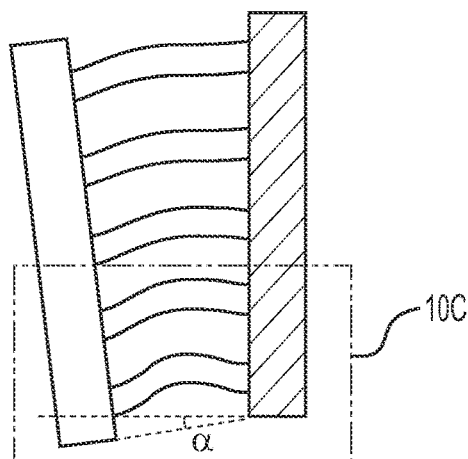
Figure 10C:
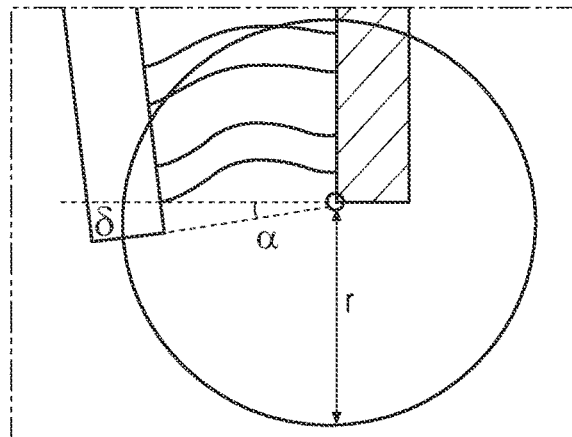
Figure 10D:
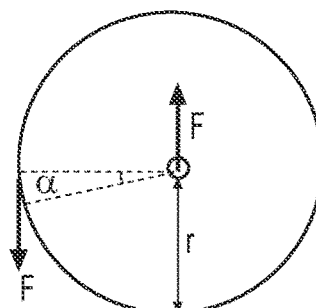

Carrier tilt stiffness is a measure of the resistance of the carrier 34 to an applied moment, M, as illustrated in FIG. 10A. The axis of the moment is perpendicular to the engine axis 9. Two points of the carrier 34 are selected for measuring tilt stiffness: a forward point at the axial position of the axial centre point of the forward plate 34a and rearward point at the axial position of the axial centre point of the rearward plate 34b. The rearward plate 34b is held to be rigid and non-rotating, as illustrated by the diagonal lines in FIGS. 10A to 10C.

Figure 11:
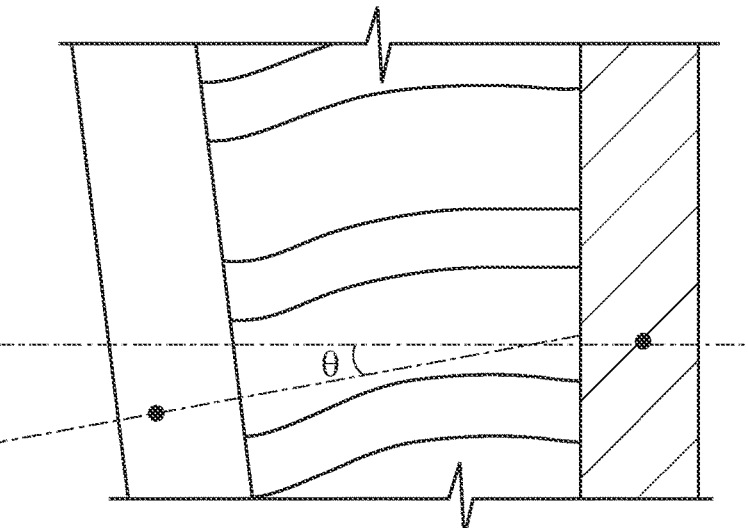
FIG. 11 is a schematic diagram illustrating tilt stiffness of the carrier.

In response to the applied moment, M, which is an anticlockwise moment in the example shown, but could be a clockwise moment in other examples, the carrier 34 bends through an angle θ—the angle θ is not constant at each point along the length of the carrier 34 as the carrier does not have a constant section. θ may therefore be measured between a line parallel to the engine axis 9 and passing through the rearward point and the forward point pre-deformation (perpendicular to forward and rear faces of the carrier plates) and a line passing through the forward point and perpendicular to forward and rear faces of the forward carrier plate (no longer parallel to the engine axis) after the deformation. This is shown in FIG. 11.

The carrier 34 bends through an overall angle α, resulting in an arc displacement δ. The angle, α, is measured between a line parallel to the engine axis 9 and passing through the rearward point and the forward point pre-deformation (as for θ) and a line passing through the forward point and the rearward point after the deformation (in contrast to θ). The values of θ and α may therefore be different.

An effective linear tilt stiffness can therefore be defined for the carrier 34 as described above. The radius, r, chosen for the definition of the effective linear tilt stiffness is that of a circle centred on a point on the surface of the plate 34b held to be rigid and passing through an original axial centrepoint of the forward plate 34a and the same point post-deformation, as shown in the close-up portion of FIG. 10C. The two equal and opposite forces, F, are marked on the schematic force diagram shown in FIG. 10D, one at the centre of the circle of radius r, and one at the far end of that radius—the magnitude of F is selected based on the moment applied. The overall angle, α, is measured between a first radius before the deformation and a second radius after the deformation. The axial centrepoint at the radial position of the lower edge of the forward plate 34a is selected for ease of reference—any other point along the axial centreline of the forward plate 34a may be selected equivalently (e.g. the point of application of the moment). The arc displacement (arc distance) δ is equal to rα.

In various embodiments, the tilt stiffness of the carrier 34 is in the range is greater than or equal to $6.00 \times 10^8$ Nm/radian, and optionally greater than or equal to $1.3 \times 10^9$ Nm/radian. In some embodiments, for example in embodiments in which the fan diameter is in the range from 240 to 280 cm, the tilt stiffness of the carrier 34 may be greater than or equal to $2.2 \times 10^9$ Nm/radian, and optionally may greater than or equal to $2.4 \times 10^9$ Nm/radian (and optionally may be equal to $2.71 \times 10^9$ Nm/radian). In some embodiments, for example in embodiments in which the fan diameter is in the range from 330 to 380 cm, the tilt stiffness of the carrier 34 may be greater than or equal to $2.3 \times 10^9$ Nm/radian and optionally may be greater than or equal to $3.0 \times 10^9$ Nm/radian (and optionally may be equal to $5.70 \times 10^9$ Nm/radian).

In various embodiments, the tilt stiffness of the carrier 34 is in the range from $6.00 \times 10^8$ to $2.80 \times 10^{11}$ Nm/radian, and optionally in the range from $1.3 \times 10^9$ to $1.2 \times 10^{11}$ Nm/radian. In some embodiments, for example in embodiments in which the fan diameter is in the range from 240 to 280 cm, the tilt stiffness of the carrier 34 may be in the range from $2.2 \times 10^9$ to $1.4 \times 10^{11}$ Nm/radian, and optionally may be in the range from $2.4 \times 10^9$ to $5.0 \times 10^9$ Nm/radian (and optionally may be equal to $2.71 \times 10^9$ Nm/radian). In some embodiments, for example in embodiments in which the fan diameter is in the range from 330 to 380 cm, the tilt stiffness of the carrier 34 may be in the range from $2.3 \times 10^9$ to $2.8 \times 10^{11}$ Nm/radian and optionally may be in the range from $3.0 \times 10^9$ to $9.0 \times 10^9$ Nm/radian (and optionally may be equal to $5.70 \times 10^9$ Nm/radian).

In various embodiments, the effective linear tilt stiffness of the carrier 34 is greater than or equal to $3.40 \times 10^9$ N/m, and optionally greater than or equal to $8.0 \times 10^9$ N/m. In some embodiments, for example in embodiments in which the fan diameter is in the range from 240 to 280 cm, the effective linear tilt stiffness of the carrier 34 may be greater than or equal to $1.4 \times 10^{10}$ N/m, and optionally may be greater than or equal to $1.42 \times 10^{10}$ N/m (and optionally may be equal to $1.68 \times 10^{10}$ N/m). In some embodiments, for example in embodiments in which the fan diameter is in the range from 330 to 380 cm, the effective linear tilt stiffness of the carrier 34 may be greater than or equal to $1.5 \times 10^{10}$ N/m and optionally may be greater than or equal to $3.0 \times 10^{10}$ N/m, and optionally greater than or equal to $7.0 \times 10^{10}$ N/m (and optionally may be equal to $8.36 \times 10^{10}$ N/m).

In various embodiments, the effective linear tilt stiffness of the carrier 34 is in the range from $3.40 \times 10^9$ to $4.20 \times 10^{12}$ N/m, and optionally in the range from $8.0 \times 10^9$ to $1.7 \times 10^{12}$ N/m. In some embodiments, for example in embodiments in which the fan diameter is in the range from 240 to 280 cm, the effective linear tilt stiffness of the carrier 34 may be in the range from $1.4 \times 10^{10}$ to $8.4 \times 10^{11}$ N/m, and optionally may be in the range from $1.42 \times 10^{10}$ to $2.72 \times 10^{10}$ N/m (and optionally may be equal to $1.68 \times 10^{10}$ N/m). In some embodiments, for example in embodiments in which the fan diameter is in the range from 330 to 380 cm, the effective linear tilt stiffness of the carrier 34 may be in the range from $1.5 \times 10^{10}$ to $4.2 \times 10^{12}$ N/m and optionally may be in the range from $3.0 \times 10^{10}$ to $1.0 \times 10^{11}$ N/m, and optionally from $7.0 \times 10^{10}$ to $1.0 \times 10^{11}$ N/m (and optionally may be equal to $8.36 \times 10^{10}$ N/m).

As discussed above, excess tilt deflections of the carrier 34 may be more damaging than radial bending or torsional deflections for the same magnitude of deflection as tilt deflections may produce two compounding effects—firstly, load share may worsen, with some planet gears 32 taking a larger share of the load than others, and secondly face distribution of that load shifts. The larger force on a particular planet gear 32 is therefore concentrated on one side of the gear rather than equally distributed across the tooth. The increased load on that gear 32 and the increased concentration of that load may therefore damage the gear teeth.

Carrier Torsional Stiffness

Figure 14:
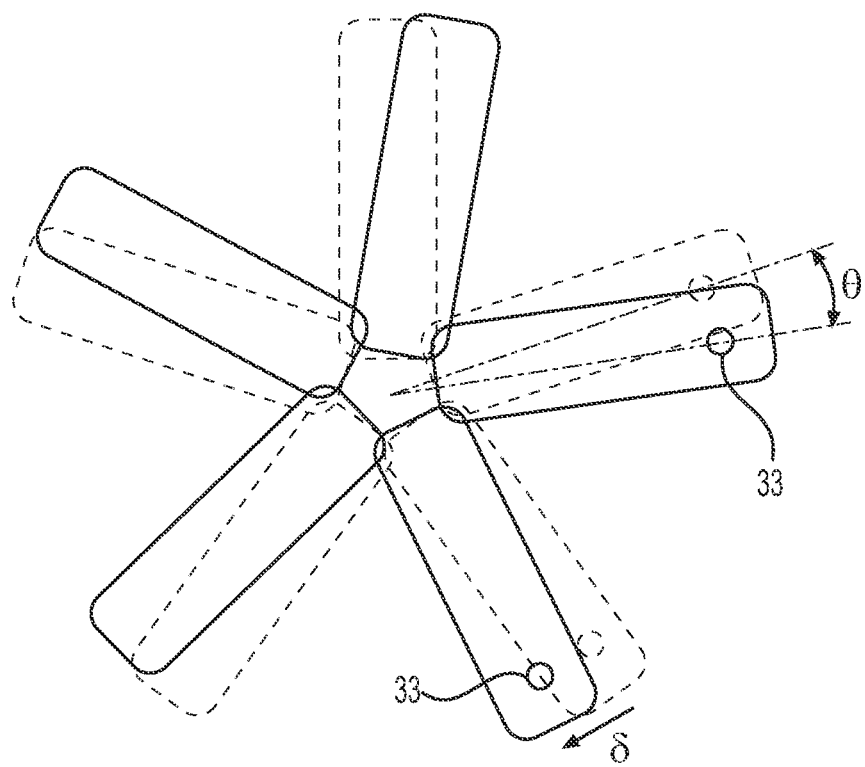
FIG. 14 is a schematic diagram illustrating torsional stiffness of the carrier of FIG. 13.

Carrier torsional stiffness is a measure of the resistance of the carrier 34 to an applied torque, r, as illustrated in FIG. 12A (axial cross-section) and FIGS. 13 to 15 (radial cross-section). The axis of the torque is parallel to the engine axis 9. The diagonal lining of the plate 34b at the rearward end of the carrier 30 indicates that plate 34b is treated as rigid and non-rotating (as for a cantilever beam mounting). In embodiments with only one plate 34a, the ends of the pins 33 (and of the lugs 34c if present) further from the single plate 34a are held in place instead.

The torque, τ, is applied to the carrier 34 (at the position of the axial mid-point of the forward plate 34a) and causes a rotational deformation, θ (e.g. twist) along the length of the carrier 34. The twist causes the carrier 34 to "wind up" as the ends of the pins 33 (and of the lugs 34c if present) are held at a fixed radius on the carrier plates 34a, 34b.

The angle through which a point on an imaginary circle 902 on the forward plate 34a passing through the longitudinal axis of each pin 33 moves is θ, where θ is the angle measured in radians. The imaginary circle 902 may be referred to as the pin pitch circle diameter (pin PCD). The pin PCD may be in the range from 0.38 to 0.65 m, for example being equal to 0.4 m or 0.55 m. An effective linear torsional stiffness can therefore be defined for the carrier 34 as described above, using the radius r of the imaginary circle 902 (e.g. as illustrated in FIG. 13).

In various embodiments, the torsional stiffness of the carrier 34 is greater than or equal to $1.60 \times 10^8$ Nm/rad, and optionally greater than or equal to $2.7 \times 10^8$ Nm/rad. In some embodiments, for example in embodiments in which the fan diameter is in the range from 240 to 280 cm, the torsional stiffness of the carrier 34 may be greater than or equal to $1.8 \times 10^8$ Nm/rad, and optionally may be greater than or equal to $2.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may greater than or equal to $6.0 \times 10^8$ Nm/rad and optionally may be greater than or equal to $1.1 \times 10^9$ Nm/rad (and optionally may be equal to $2.17 \times 10^9$ Nm/rad).

In various embodiments, the torsional stiffness of the carrier 34 is in the range from $1.60 \times 10^8$ to $1.00 \times 10^{11}$ Nm/rad, and optionally in the range from $2.7 \times 10^8$ to $1 \times 10^{10}$ Nm/rad. In some embodiments, for example in embodiments in which the fan diameter is in the range from 240 to 280 cm, the torsional stiffness of the carrier 34 may be in the range from $1.8 \times 10^8$ to $4.8 \times 10^9$ Nm/rad, and optionally may be in the range from $2.5 \times 10^8$ to $6.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may be in the range from $6.0 \times 10^8$ to $2.2 \times 10^{10}$ Nm/rad and optionally may be in the range from $1.1 \times 10^9$ to $3.0 \times 10^9$ Nm/rad (and optionally may be equal to $2.17 \times 10^9$ Nm/rad).

In various embodiments, the effective linear torsional stiffness of the carrier 34 may be greater than or equal to $7.00 \times 10^9$ N/m, and optionally greater than or equal to $9.1 \times 10^9$ N/m. In some embodiments, for example in embodiments in which the fan diameter is in the range from 240 to 280 cm, the effective linear torsional stiffness of the carrier 34 may be greater than or equal to $7.70 \times 10^9$ N/m. In other such embodiments, the effective linear torsional stiffness of the carrier 34 may be greater than or equal to $9.1 \times 10^9$ N/m, optionally greater than or equal to $1.1 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be greater than or equal to $1.2 \times 10^{10}$ N/m and optionally may be greater than or equal to $2.1 \times 10^{10}$ N/m (and optionally may be equal to $2.88 \times 10^{10}$ N/m).

In various embodiments, the effective linear torsional stiffness of the carrier 34 may be in the range from $7.00 \times 10^9$ to $1.20 \times 10^{11}$ N/m, and optionally in the range from $9.1 \times 10^9$ to $8.0 \times 10^{10}$ N/m. In some embodiments, for example in embodiments in which the fan diameter is in the range from 240 to 280 cm, the effective linear torsional stiffness of the carrier 34 may be in the range from $9.1 \times 10^9$ to $6.0 \times 10^{10}$ N/m, and optionally may be in the range from $7 \times 10^9$ to $2 \times 10^{10}$ N/m, or from $8.5 \times 10^9$ to $2 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be in the range from $1.2 \times 10^{10}$ to $1.2 \times 10^{11}$ N/m and optionally may be in the range from $1.0 \times 10^{10}$ to $5.0 \times 10^{10}$ N/m (and optionally may be equal to $2.88 \times 10^{10}$ N/m).

The torsional stiffness of the carrier 34 may be controlled so as to be within a desired range by adjusting one or more parameters, including carrier material(s), carrier geometry, and the presence or absence of lugs.

Planet Pin Stiffnesses

The planet carrier 34 holds the planet gears 32 in place. The pins 33 serve to locate each planet gear 32 on the carrier 34 and to reduce or avoid misalignment of the planet gears 32. In the embodiment shown in FIGS. 16A to 16C, five planet gears 32 are provided in the gearbox 30, with one pin 33 for each planet gear 32. In alternative embodiments, a different number of planet gears 32 may be provided, for example 3, 4, 5, 6, 7, 8 or 9 planet gears 32. The skilled person would appreciate that an odd number of planet gears (e.g. 3, 5, 7, 9) may improve load and/or stress sharing within the gearbox 30. In particular, the skilled person would appreciate that the use of an odd number of planet gears may improve the dynamic loading in gearboxes which have sun gear tooth numbers which are not whole numbers divisible by the number of planets (e.g. 41 sun gear teeth, 5 planets) as in the embodiment being described. In alternative embodiments in which the sun gear tooth number is wholly divisible by the number of planets (e.g. sun gear 40 teeth, 5 planets) there may be less or no dynamic benefit.

Each planet gear 32 is mounted to the rest of the planet carrier 34 by a pin 33, also referred to as a planet pin. The planet pins 33 are mounted on the carrier 34 such that they move with the carrier 34 as the carrier rotates in a planetary arrangement, or remain in place with a non-rotating carrier 34 in a star arrangement. The pins 33 may be referred to as axles/supports for the planets 32. A lower stiffness of the planet pins 33 may reduce differential load and improve load share factor relative to a higher stiffness of the planet pins 33.

The pins 33 may be connected to the carrier plates 342, 34b in any desired manner. For example, in the embodiment being described, the pins 33 are provided with a soft connection 31a, 31b to each carrier plate 34a, 34b. The connection is described as soft as it is arranged to facilitate some movement of the pins 33, which may help to improve load share. Such a soft connection may be formed by the plate 34a,b itself—for example having cut-away portions of material to provide some movement of the plate—or by a part of the pin, or by a separate component. The soft connections 31a, 31b are classed as a part of the pin 33 for the assessment of the stiffnesses described herein. The soft connections 33a, 33b are illustrated only for the pin of interest in FIGS. 16 and 17, but the skilled person would appreciate that each pin 33 would have an equivalent connection.

Planet Pin Radial Bending Stiffness

Figure 16A:
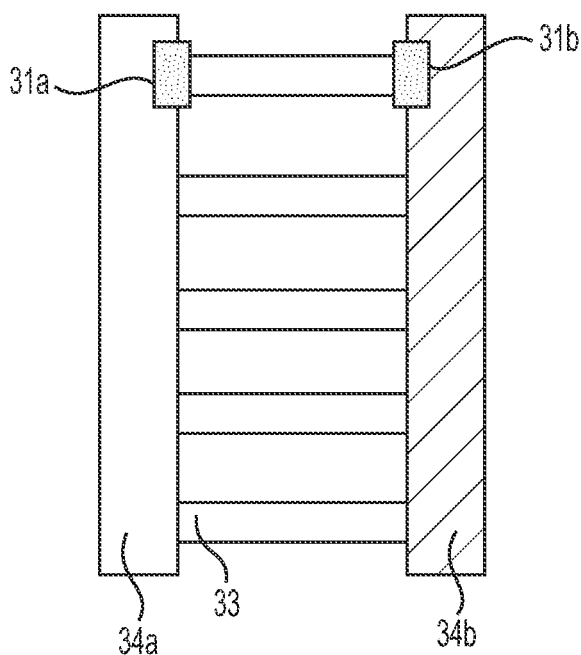
FIGS. 16A to 16C are schematic diagrams illustrating radial bending stiffness of unjointed pins.
Figure 16B:
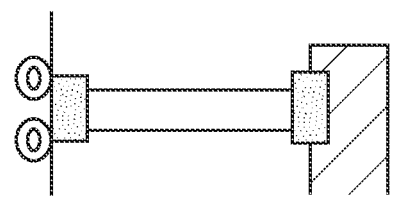
Figure 16C:
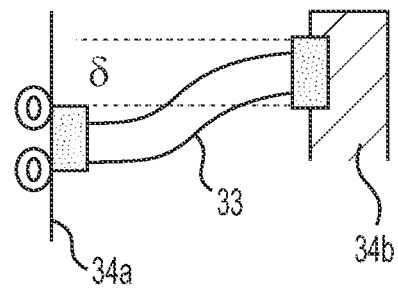

The radial bending stiffness of a pin 33 may be measured in different ways, for example depending on the pin design. The soft connections 31a, 31b of the pin 33, if present, are classed as a part of the pin 33. For an unjointed pin 33, as shown in FIGS. 16A to 16C, each pin 33 may be treated as being rigidly mounted on one carrier plate 34b (illustrated by the diagonal lines on the carrier plate 34b). The other end of each pin may be treated as being slidably mounted on the other carrier plate 34a, such that the end of the pin 33 can slide along the plate 34a, but cannot move away from the plate 34a. A radial force, F, is then applied at the position on the pin corresponding to the sliding plane, and a resultant radial displacement, $\delta$, at that axial position is measured.

Figure 17A:
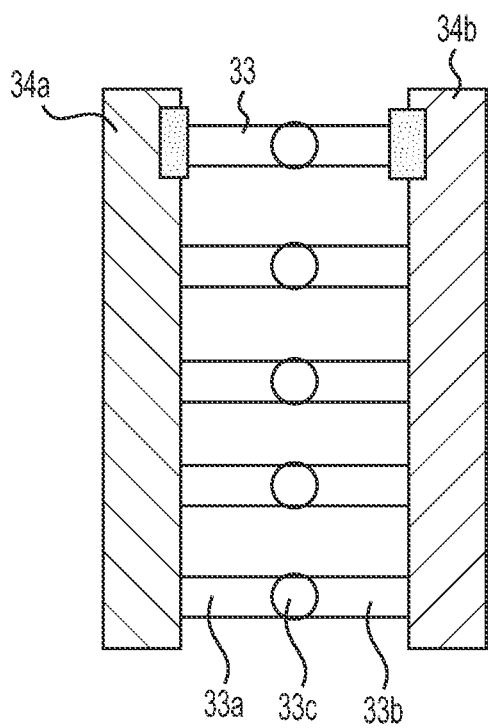
FIGS. 17A to 17C are schematic diagrams illustrating radial bending stiffness of jointed pins.
Figure 17B:
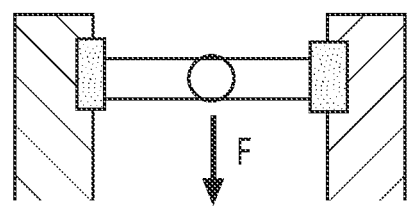
Figure 17C:
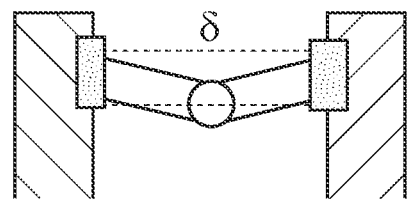

For a pin 33 with two separate shaft portions 33a, 33b and a joint 33c (e.g. a ball joint) between the two, as shown in FIGS. 17A to 17C, the pin 33 may instead be treated as being rigidly mounted on both carrier plates 34a,34b (illustrated by the diagonal lines on the carrier plates 34a, 34b). A radial force, F, is then applied at the position on the pin 33 corresponding to the axial centre point of the pin, and a resultant radial displacement, $\delta$, at that axial position is measured. In embodiments with a non-central joint 33c, the axial centre point of the joint 33c may be selected in place of the axial centre point of the pin 33.

In various embodiments, the radial bending stiffness of the pin 33 is greater than or equal to $3.00\times10^8$ N/m, and optionally greater than or equal to $6.3\times10^8$ N/m. In some embodiments, for example in embodiments in which the fan diameter is in the range from 240 to 280 cm, the radial bending stiffness of the pin 33 shaft may be greater than or equal to $6.3\times10^8$ N/m, and optionally may be greater than or equal to $6.7\times10^8$ N/m (and optionally may be equal to $7.70\times10^8$ N/m). In some embodiments, for example in embodiments in which the fan diameter is in the range from 330 to 380 cm, the radial bending stiffness of the pin 33 may be greater than or equal to $9.0\times10^8$ N/m and optionally may be greater than or equal to $1.0\times10^9$ N/m (and optionally may be equal to $1.54\times10^9$ N/m).

In various embodiments, the radial bending stiffness of the pin 33 is in the range from $3.00\times10^8$ to $3.00\times10^9$ N/m, and optionally in the range from $6.3\times10^8$ to $2.5\times10^9$ N/m. In some embodiments, for example in embodiments in which the fan diameter is in the range from 240 to 280 cm, the radial bending stiffness of the pin 33 shaft may be in the range from $6.3\times10^8$ to $1.5\times10^9$ N/m, and optionally may be in the range from $6.7\times10^8$ to $8.7\times10^8$ N/m (and optionally may be equal to $7.70\times10^8$ N/m). In some embodiments, for example in embodiments in which the fan diameter is in the range from 330 to 380 cm, the radial bending stiffness of the pin 33 may be in the range from $9.0\times10^8$ to $3.0\times10^9$ N/m and optionally may be in the range from $1.0\times10^9$ to $2.0\times10^9$ N/m (and optionally may be equal to $1.54\times10^9$ N/m).

The skilled person would appreciate that the desired pin stiffness may be obtained in various different ways, for example by adjusting one or more of pin material(s) (often steels) and gearbox and/or pin geometry as appropriate. For a given material, the stiffness may be a function of pin diameter and whether the pin is solid, or hollow, for example. By way of further example, the gear ratio of the gearbox 30 may be adjusted and the planet gear size may change accordingly, for example allowing for a larger diameter pin 33 for a larger planet gear 32, so achieving a higher stiffness.

Planet Pin Tilt Stiffness

Figure 18A:
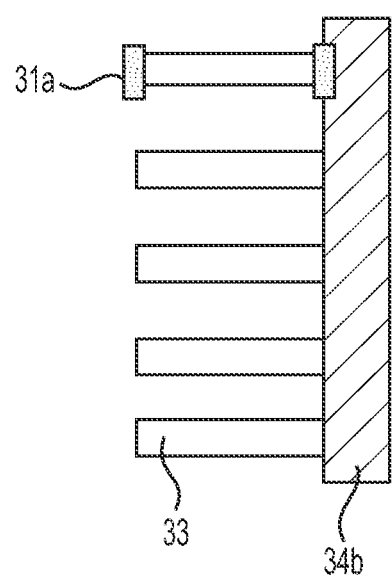
FIGS. 18A and 18B are schematic diagrams illustrating tilt stiffness of pins.
Figure 18B:
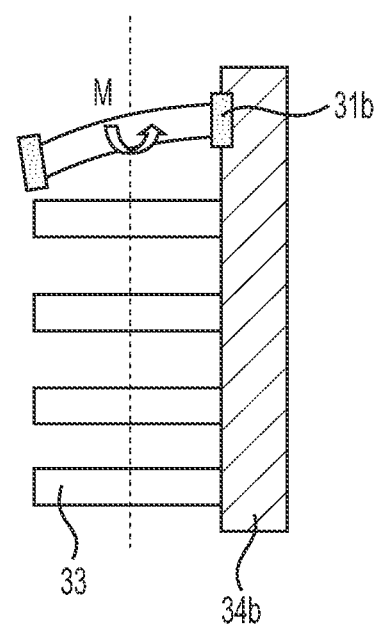

Each pin 33 (including its soft connections 31a, 31b, if present) is modelled as a free body rigidly mounted on one carrier plate 34b (illustrated by the diagonal lines on the carrier plate 34b as shown in FIGS. 18A and 18B) to calculate the tilt stiffness. A moment is then applied at the axial centre point of the pin 33. The axis of the moment is perpendicular to the engine axis 9. Two points of the pin 33 are selected for measuring tilt stiffness: a central point at the axial position of the axial centre point of the pin 33, and a rearward point at the axial position of the rigid connection to the rearward plate 34b. The rearward plate 34b is held to be rigid and non-rotating, as illustrated by the diagonal lines in FIGS. 17 and 18.

In response to the applied moment, M, which is an anticlockwise moment in the example shown, but could be a clockwise moment in other examples, the pin 33 bends through an angle $\theta$, resulting in an arc displacement $\delta$ of the central point (the point of application of the moment).

If the pin 33 is asymmetric, a second measurement may be taken modelling the pin 33 as a free body rigidly mounted on the other carrier plate 34a. Two points of the pin 33 are selected for this measurement: a central point at the axial position of the axial centre point of the pin 33, and a forward point at the axial position of the rigid connection to the forward plate 34a. The forward plate 34a is held to be rigid and non-rotating. An average of the two tilt stiffness values may then be taken.

An effective linear tilt stiffness can therefore be defined for the pin 33 as described above. The radius, r, chosen for the definition of the effective linear tilt stiffness is that of a circle centred on a point on the surface of the plate 34b held to be rigid and passing through an original axial centrepoint of the pin 33 (the point of application of the moment) and the same point post-deformation. The arc displacement $\delta$ is equal to $r\theta$.

The same approach may be used for any design of pin 33.

In various embodiments, the tilt stiffness of the pin 33 is greater than or equal to $4.00\times10^6$ Nm/rad, and optionally greater than or equal to $8.7 \times 10^6$ Nm/rad. In some embodiments, for example in embodiments in which the fan diameter is in the range from 240 to 280 cm, the tilt stiffness of the pin 33 may be greater than or equal to $8.7 \times 10^6$ Nm/rad, and optionally may be greater than or equal to $9.8 \times 10^6$ Nm/rad (and optionally may be equal to $1.02 \times 10^7$ Nm/rad). In some embodiments, for example in embodiments in which the fan diameter is in the range from 330 to 380 cm, the tilt stiffness of the pin 33 may be greater than or equal to $1.4 \times 10^7$ Nm/rad and optionally may be greater than or equal to $2.5 \times 10^7$ Nm/rad (and optionally may be equal to $3.14 \times 10^7$ Nm/rad).

In various embodiments, the tilt stiffness of the pin 33 is in the range from $4.00 \times 10^6$ to $6.30 \times 10^7$ Nm/rad, and optionally in the range from $8.7 \times 10^6$ to $4.5 \times 10^7$ Nm/rad. In some embodiments, for example in embodiments in which the fan diameter is in the range from 240 to 280 cm, the tilt stiffness of the pin 33 may be in the range from $8.7 \times 10^6$ to $2.1 \times 10^7$ Nm/rad, and optionally may be in the range from $9.8 \times 10^6$ to $1.9 \times 10^7$ Nm/rad (and optionally may be equal to $1.02 \times 10^7$ Nm/rad). In some embodiments, for example in embodiments in which the fan diameter is in the range from 330 to 380 cm, the tilt stiffness of the pin 33 may be in the range from $1.4 \times 10^7$ to $6.3 \times 10^7$ Nm/rad and optionally may be in the range from $2.5 \times 10^7$ to $4.2 \times 10^7$ Nm/rad (and optionally may be equal to $3.14 \times 10^7$ Nm/rad).

In order to obtain a desired pin tilt stiffness, similar options may apply as for planet pin radial bending stiffness described above.

Stiffnesses of Shafts and Supports

Gearbox Input Shaft Torsional Stiffness

In the arrangement being described, the gearbox input shaft 26a drives the sun gear 28. The gearbox input shaft 26a may therefore be referred to as a sun input shaft 26a. The gearbox input shaft 26a may be a sun input shaft 26a in star arrangements (as well as planetary). The gearbox input shaft 26a may also be referred to as a part of the core shaft 26—a forward portion 26a of the core shaft 26 provides the input to the gearbox 30.

The core shaft 26 therefore comprises a gearbox input shaft 26a, which rotates with the rest of the core shaft 26 but may have a different stiffness from the rest of the core shaft. In the arrangement being described with respect to FIGS. 1 and 2, the core shaft extends between the turbine 19 and the gearbox 30, connecting the turbine 19 to the compressor 14, and the turbine and compressor to the gearbox 30. A rearward portion 26b of the core shaft 26 extends between the turbine 19 and the compressor 14, connecting the turbine to the compressor. A forward portion 26a extends between the compressor 14 and the gearbox, connecting the turbine and compressor to the gearbox 30. As this forward portion provides the torque to the gearbox 30, it is referred to as the gearbox input shaft. In the arrangement shown, a bearing 26c is present on the core shaft 26 at or near the axial position at which the rearward portion 26b meets the gearbox input shaft 26a.

In some gearboxes 30, the planet carrier 34 may be driven by the core shaft 26, and more specifically by the gearbox input shaft 26a, for example—in such embodiments, the gearbox input shaft 26a may not be a sun input shaft 26. However, this may make mounting of the sun gear 28 more difficult.

Figure 19A:
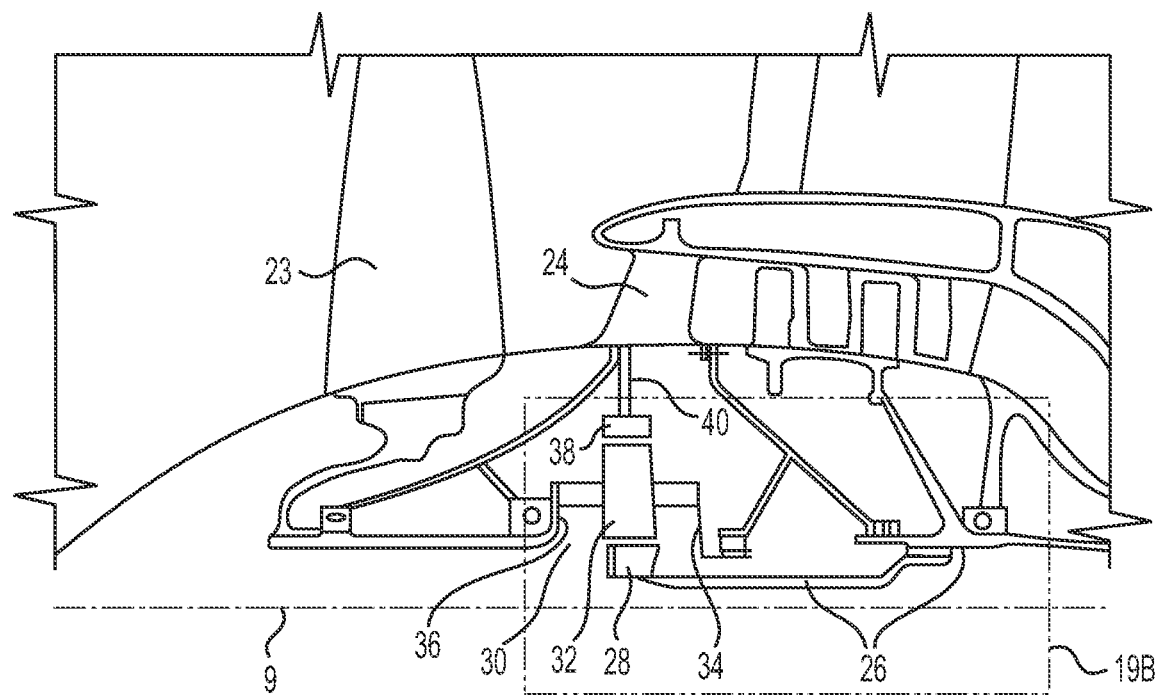
FIGS. 19A and 19B are schematic diagrams illustrating the core shaft, and in particular the gearbox input shaft.
Figure 19B:
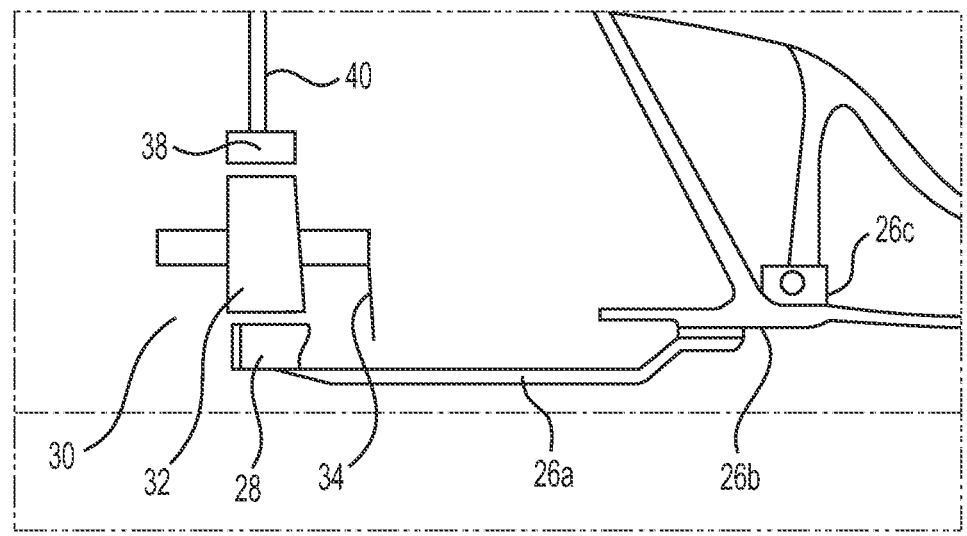

In the described arrangement, the core shaft 26 is divided into two sections as shown in FIGS. 19A and 19B: a first section 26a (the gearbox input shaft) extending from the gearbox 30 and connected to the sun gear 28, and a second section 26b extending rearwardly from the first section and connected to the turbine 19. In the described arrangement, the first section 26a is designed to have a lower stiffness than the second section 26b—the gearbox input shaft 26a may therefore provide a soft mounting for the sun gear 28 whilst maintaining rigidity elsewhere in the engine 10. In the described arrangement, the second section 26b is designed to be effectively rigid (as compared to the stiffness of the first section 26a)—a torsional stiffness of the core shaft 26 may therefore be effectively equal to the torsional stiffness of the gearbox input shaft portion thereof. The second section 26b connecting the turbine and the compressor may be referred to as the turbine shaft 26b. The turbine shaft 26b is arranged to transmit the torsional loads to drive the compressor and the gearbox 30, as well as the compressor and turbine axial loads.

In alternative embodiments, the core shaft 26 may not be divided into sections of different stiffness, and may instead have a constant stiffness. In alternative or additional embodiments, the core shaft 26 may be divided into a larger number of sections.

The core shaft 26 is mounted using a bearing 26c—the bearing 26c is the first bearing on the core shaft 26 axially downstream of the gearbox 30. In the described arrangement, the bearing 26c is on the second section 26b of the shaft 26—in other embodiments, it may be on a different, or on the only, shaft section. The stiffnesses of the gearbox input shaft 26a are measured holding the bearing 26c rigid, and taking the connection of the bearing 26c to the rest of the core shaft 26b as rigid, such that only the stiffnesses of the first portion 26a are considered. For the purpose of determining torsional stiffness, the gearbox input shaft 26a is considered to be free at the end to which the applied torque $\tau$ is applied.

Figure 20:
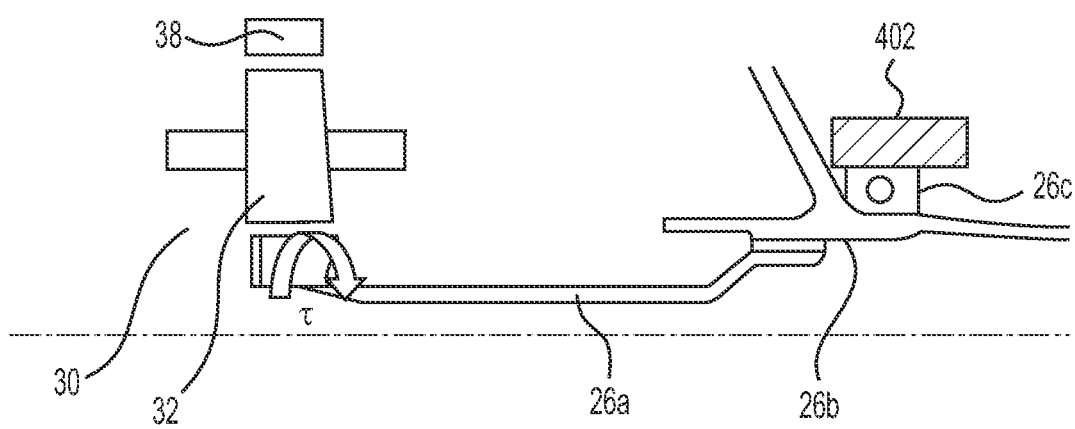
FIG. 20 is a schematic diagram illustrating the torsional stiffness of the gearbox input shaft.

Gearbox input shaft torsional stiffness is a measure of the resistance of the shaft 26a to an applied torque, $\tau$, as illustrated in FIG. 20. It may be described as resistance to twisting, or winding, of the shaft 26a. The axis of the moment is parallel to the engine axis 9. The diagonally lined box 402 at the location of the bearing 26c of the shaft 26a is shown to indicate the connection to the bearing 26c/the shaft 26 at the position of the bearing as being treated as rigid and non-rotating (as for a cantilever beam mounting). The shaft 26a is otherwise treated as a free body (the sun gear-planet gear mesh stiffness is not included).

A torque, $\tau$, is applied to the shaft 26a (at the forward position—the position of the axial mid-point of the sun gear 28) and causes a rotational deformation, $\theta$ (e.g. twist) along the length of the shaft 26a. $\theta$ is measured at the position of application of the torque. As described above, the core shaft 26 is held to be non-rotating at the location of the bearing 26c, such that the value of the twist increases from zero to $\theta$ along the length of the first shaft portion 26a. The angle through which a point on the shaft circumference at the forward position moves is $\theta$, where $\theta$ is the angle measured in radians. r is the radius of the shaft 26a. In embodiments in which the gearbox input shaft 26 varies in radius, the radius of the shaft 26a at the interface to the sun gear 28 may be used as the radius r to calculate the effective linear torsional stiffness (i.e. the radius at the forward end of the shaft for the embodiment shown, where the torque is applied). An effective linear torsional stiffness can therefore be defined for the gearbox input shaft 26a as described above.

In the embodiment shown, the position of the axial mid-point of the sun gear 28 is also at or near the forward end of the shaft 26. In alternative embodiments, the shaft 26 may extend further forward of the sun gear 28; the forward position used for the application of the torque, force or moment is still taken to be the position of the axial mid-point of the sun gear 28 in such embodiments.

In various embodiments, the torsional stiffness of the gearbox input shaft 26a is greater than or equal to $1.4 \times 10^6$ Nm/radian, and optionally greater than or equal to $1.6 \times 10^6$ Nm/radian. In some embodiments, for example in embodiments in which the fan diameter is in the range from 240 to 280 cm, the torsional stiffness of the gearbox input shaft may be greater than or equal to $1.4 \times 10^6$ Nm/radian or $1.8 \times 10^6$ Nm/radian. In some embodiments, for example in embodiments in which the fan diameter is in the range from 330 to 380 cm, the torsional stiffness of the gearbox input shaft may be greater than or equal to $3 \times 10^6$ Nm/radian or $5 \times 10^6$ Nm/radian.

In various embodiments, the torsional stiffness of the gearbox input shaft 26a is in the range from $1.4 \times 10^6$ to $2.5 \times 10^8$ Nm/radian, and optionally in the range from $1.6 \times 10^6$ to $2.5 \times 10^7$ Nm/radian. In some embodiments, for example in embodiments in which the fan diameter is in the range from 240 to 280 cm, the torsional stiffness of the gearbox input shaft may be in the range from $1.4 \times 10^6$ to $2.0 \times 10^7$ Nm/radian, and optionally may be in the range from $1.8 \times 10^6$ to $3 \times 10^6$ Nm/radian (and optionally may be equal to $2.0 \times 10^6$ Nm/radian). In some embodiments, for example in embodiments in which the fan diameter is in the range from 330 to 380 cm, the torsional stiffness of the gearbox input shaft may be in the range from $3 \times 10^6$ to $1 \times 10^8$ Nm/radian and optionally may be in the range from $5 \times 10^6$ to $6 \times 10^6$ Nm/radian (and optionally may be equal to $5.7 \times 10^6$ Nm/radian).

In various embodiments, the effective linear torsional stiffness of the gearbox input shaft 26a is greater than or equal to $4.0 \times 10^8$ N/m, and optionally greater than or equal to $4.3 \times 10^8$ N/m. In some embodiments, for example in embodiments in which the fan diameter is in the range from 240 to 280 cm, the effective linear torsional stiffness of the gearbox input shaft may be greater than or equal to $4.0 \times 10^8$ N/m or $4.4 \times 10^8$ N/m. In some embodiments, for example in embodiments in which the fan diameter is in the range from 330 to 380 cm, effective linear torsional stiffness of the gearbox input shaft may be greater than or equal to $4.3 \times 10^8$ N/m or $6.8 \times 10^8$ N/m.

In various embodiments, the effective linear torsional stiffness of the gearbox input shaft is in the range $4.0 \times 10^8$ to $3.0 \times 10^{10}$ N/m, and optionally in the range from $4.3 \times 10^8$ to $9.0 \times 10^9$ N/m. In some embodiments, for example in embodiments in which the fan diameter is in the range from 240 to 280 cm, the effective linear torsional stiffness of the gearbox input shaft may be in the range from $4.0 \times 10^8$ to $1.5 \times 10^{10}$ N/m, and optionally may be in the range from $4.4 \times 10^8$ to $5.4 \times 10^9$ N/m (and optionally may be equal to $4.9 \times 10^8$ N/m, and optionally $4.92 \times 10^8$ N/m). In some embodiments, for example in embodiments in which the fan diameter is in the range from 330 to 380 cm, the effective linear torsional stiffness of the gearbox input shaft may be in the range from $4.3 \times 10^8$ to $3.0 \times 10^{10}$ N/m and optionally may be in the range from $5.0 \times 10^8$ to $8.0 \times 10^{10}$ N/m (and optionally may be equal to $6.8 \times 10^8$ N/m, and optionally $6.84 \times 10^8$ N/m).

One or more of gearbox input shaft 26a material(s), diameter and structure (e.g. hollow or solid, wall thickness) may be adjusted to achieve a stiffness within the desired range.

Fan Shaft Torsional Stiffness

The fan shaft 36 is defined as the torque transfer component that extends from the output of the gearbox 30 to the fan input. It therefore includes part or all of any gearbox output shaft and fan input shaft that may be provided between those points. For the purposes of defining the stiffness of the fan shaft 36, it is considered to extend between a fan input position and a gearbox output position, and to include all of the torque transfer components between those points. It does not therefore include any components of the gearbox 30 (e.g. the planet carrier 34 or any connecting plate coupled to it) which transmit discrete forces, rather than the fan shaft torque. The gearbox output position therefore may be defined as the point of connection between the fan shaft 36 and the gearbox 30. The fan input position, Y, may be defined as the point of connection between the fan shaft 36 and the fan. The torsional stiffness of the fan shaft 36 is measured between the forward and rearward ends of the fan shaft; the forward end being the interface (Y) with the fan 23 and the rearward end the interface (X) with the gearbox 30.

Fan shaft torsional stiffness is a measure of the resistance of the shaft 36 to an applied torque, τ, as illustrated in FIG. 25. It may be described as resistance to twisting, or winding, of the shaft 36. The axis of the moment is parallel to the engine axis 9.

Referring to FIGS. 23 and 25, where the gearbox 30 is a star gearbox, the gearbox output position (X) is defined as the point of connection 702 between the ring gear 38 and the fan shaft 36. More specifically, it is the point of connection to the annulus of the ring gear 38 (with any connection component extending from the outer surface of the annulus being considered to be part of the ring gear). Where the point of connection is formed by an interface extending in a direction having an axial component, the point of connection is considered to be the axial centreline (X) of that interface as illustrated in FIG. 25. The fan shaft 36 includes all torque transmitting components up to the point of connection 702 with the ring gear 38. It therefore includes any flexible portions or linkages 704 of the fan shaft 36 that may be provided, and any connection(s) 706 (e.g. spline connections) between them.

Where the gearbox 30 is in a planetary configuration, the gearbox output position is again defined as the point of connection between the fan shaft 36 and the gearbox 30. An example of this is illustrated in FIG. 24, which shows a carrier comprising a forward plate 34a and rearward plate 34b, with a plurality of pins 33 extending between them and on which the planet gears are mounted. The fan shaft 36 is connected to the forward plate 34a via a spline connection 708. In an embodiment such as this, the gearbox output position, X, is taken as any point on the interface between the fan shaft 36 and the forward plate 34a. The forward plate 34a is considered to transmit discrete forces, rather than a single torque, and so is taken to be part of the gearbox 30 rather than the fan shaft. FIG. 24 shows only one example of a type of connection between the fan shaft and planet carrier 34. In embodiments having different connection arrangements, the gearbox output position is still taken to be at the interface between components transmitting a torque (i.e. that are part of the fan shaft) and those transmitting discrete forces (e.g. that are part of the gearbox). The spline connection 708 is only one example of a connection that may be formed between the fan shaft 36 and gearbox 30 (i.e. between the fan shaft and the forward plate 34b in the presently described embodiment). In other embodiments, the interface which forms the gearbox output position may be formed by, for example, a curvic connection, a bolted joint or other toothed or mechanically dogged arrangement.

The fan input position, Y, is defined as a point on the fan shaft 36 at the axial midpoint of the interface between the fan 23 and the fan shaft 36. In the presently described embodiment, the fan 23 comprises a support arm 23a arranged to connect the fan 23 to the fan shaft 36. The support arm 23a is connected to the fan shaft by a spline coupling 36a that extends along the length of a portion of the fan shaft 36. The fan input position is defined as the axial midpoint of the spline coupling as indicated by axis Y in FIG. 25. The spline coupling shown in FIG. 25 is only one example of a coupling that may form the interface between the fan and fan shaft. In other embodiments, for example, a curvic connection, a bolted joint or other toothed or mechanically dogged arrangement may be used. The fan input position, Y, may be unaffected by gearbox type.

The fan shaft 36 has a degree of flexibility characterised in part by its torsional stiffness. For the purpose of determining torsional stiffness, the fan shaft 36 is considered to be free at the end to which the applied torque, τ, is applied.

The diagonally lined ring gear 38 in FIG. 25 indicates the ring gear 38 being treated as rigid and non-rotating for the purpose of assessing torsional stiffness of the fan shaft 36. A torque, τ, is applied to the shaft 36 at the fan input position, Y, and causes a rotational deformation, θ (e.g. twist) along the length of the shaft 36. The angle through which a point on the shaft circumference at the fan input position moves is θ, where θ is the angle measured in radians. The radius, r, of the fan shaft 36 may be used to determine an effective linear torsional stiffness. In embodiments in which the fan shaft 36 varies in radius, such as the embodiment being described, the radius of the shaft 36 at the fan input position may be used as the radius r (i.e. the radius at the forward end of the shaft for the embodiment shown). An effective linear torsional stiffness can therefore be defined for the fan shaft 36 as described above.

In various embodiments, the torsional stiffness of the fan shaft 36 is equal to or greater than $1.3 \times 10^7$ Nm/rad, and optionally equal to or greater than $1.4 \times 10^7$ Nm/rad. In some embodiments, for example in embodiments in which the fan diameter is in the range from 240 to 280 cm the torsional stiffness of the fan shaft 36 may equal to or greater than $1.3 \times 10^7$ Nm/radian, and optionally may be equal to or greater than $1.4 \times 10^7$ Nm/radian (and optionally may be equal to $1.8 \times 10^7$ Nm/radian). In some embodiments, for example in embodiments in which the fan diameter is in the range from 330 to 380 cm, the torsional stiffness of the fan shaft 36 may be equal to or greater than $2.5 \times 10^7$ Nm/radian and optionally may be equal to or greater than $3.5 \times 10^7$ Nm/radian (and optionally may be equal to $5.2 \times 10^7$ Nm/radian).

In various embodiments, the torsional stiffness of the fan shaft 36 is in the range from $1.3 \times 10^7$ to $2.5 \times 10^9$ Nm/rad, and optionally in the range from $1.4 \times 10^7$ to $3.0 \times 10^8$ Nm/rad. In some embodiments, for example in embodiments in which the fan diameter is in the range from 240 to 280 cm the torsional stiffness of the fan shaft 36 may be in the range from $1.3 \times 10^7$ to $2.0 \times 10^8$ Nm/radian, and optionally may be in the range from $1.3 \times 10^7$ or $1.4 \times 10^7$ to $2.3 \times 10^7$ Nm/radian (and optionally may be equal to $1.8 \times 10^7$ Nm/radian). In some embodiments, for example in embodiments in which the fan diameter is in the range from 330 to 380 cm, the torsional stiffness of the fan shaft 36 may be in the range from $2.5 \times 10^7$ to $2.5 \times 10^9$ Nm/radian and optionally may be in the range from $3.5 \times 10^7$ to $7.5 \times 10^7$ Nm/radian (and optionally may be equal to $5.2 \times 10^7$ Nm/radian).

In various embodiments, the effective linear torsional stiffness of the fan shaft 36 may be greater than $1.2 \times 10^9$ N/m, and optionally greater than $1.35 \times 10^9$ N/m. In some embodiments, for example in embodiments in which the fan diameter is in the range from 240 to 280 cm, the effective linear torsional stiffness of the fan shaft 36 may be greater than $1.2 \times 10^9$ N/m, and optionally may be greater than $1.3 \times 10^9$ Nm/radian (and optionally may be equal to $1.5 \times 10^9$ N/m). In some embodiments, for example in embodiments in which the fan diameter is in the range from 330 to 380 cm, the effective linear torsional stiffness of the fan shaft 36 may be greater than $1.5 \times 10^9$ N/m and optionally may be greater than $1.8 \times 10^9$ Nm/radian (and optionally may be equal to $2.1 \times 10^9$ N/m).

In various embodiments, the effective linear torsional stiffness of the fan shaft 36 is in the range from $1.2 \times 10^9$ to $2.0 \times 10^{10}$ N/m, and optionally in the range from $1.35 \times 10^9$ to $1.0 \times 10^{10}$ N/m. In some embodiments, for example in embodiments in which the fan diameter is in the range from 240 to 280 cm, the effective linear torsional stiffness of the fan shaft 36 may be in the range from $1.2 \times 10^9$ to $1.5 \times 10^{10}$ N/m, and optionally may be in the range from $1.3 \times 10^9$ to $2.3 \times 10^9$ Nm/radian (and optionally may be equal to $1.5 \times 10^9$ N/m). In some embodiments, for example in embodiments in which the fan diameter is in the range from 330 to 380 cm, the effective linear torsional stiffness of the fan shaft 36 may be in the range from $1.5 \times 10^9$ to $2.0 \times 10^{10}$ N/m and optionally may be in the range from $1.8 \times 10^9$ to $3.5 \times 10^9$ Nm/radian (and optionally may be equal to $2.1 \times 10^9$ N/m).

One or more of fan shaft 36 material(s), diameter and structure (e.g. hollow or solid, wall thickness) may be adjusted to achieve a stiffness within the desired range.

In various embodiments, including the arrangements being described, e.g. with respect to FIGS. 21 and 22, a mounting structure for the fan shaft 36 comprises a fan shaft support structure 504. The fan shaft support structure comprises two bearings—a first bearing 506a and a second bearing 506b—via which it is coupled to the fan shaft 36. The bearings 506a, 506a are spaced apart along the axial length of the fan shaft 36. In the described embodiment, both bearings 506a, 506b are provided at positions that are forward of the gearbox 30. In other embodiments, one of the two bearing 506a, 506b used to support the fan shaft 36 may be located at a position rearward of the gearbox 30. In yet other embodiments, more than two bearings may be provided as part of the fan shaft support structure.

Gearbox Support Torsional Stiffness

An exemplary embodiment of the gas turbine engine is shown in FIG. 22, which provides an enlarged view of a region of the engine core 11 around the gearbox 30. The same reference numbers have been used for components corresponding to those shown in FIGS. 1 to 3. In the arrangement shown in FIG. 22 the gearbox 30 has a star arrangement, in which the ring gear 38 is coupled to the fan shaft 36 and the carrier 34 is held in a fixed position relative to the static structure 24 (also referred to as the stationary supporting structure) of the engine core. As noted elsewhere herein, all features and characteristics described herein may apply to a star gearbox and a planetary gearbox, unless explicitly stated otherwise.

The engine core 11 comprises a gearbox support 40 (corresponding to the linkage described with reference to FIG. 2) arranged to at least partially support the gearbox 30 in a fixed position within the engine 10. The gearbox support is coupled at a first end to the stationary supporting structure 24 which extends across the core duct 20 carrying the core airflow A as illustrated in FIG. 22. In the presently described arrangement, the stationary support structure 24 is or comprises an engine section stator (ESS) that acts as both a structural component to provide a stationary mounting for core components such as the gearbox support 40, and as a guide vane provided to direct airflow from the fan 23. In other embodiments, the stationary supporting structure 24 may comprise a strut extending across the core gas flow path and a separate stator vane provided to direct airflow. In the present embodiment, the gearbox support 40 is coupled at a second end to the planet carrier 34. The gearbox support 40 therefore acts against rotation of the planet carrier 34 relative to the static structure 24 of the engine core. In embodiments where the gearbox 30 is in a planetary arrangement, the gearbox support 40 is coupled to the ring gear 38 so as to resist its rotation relative to the static structure 24 of the engine core.

The gearbox support 40 is defined between the point at which it connects to the gearbox (e.g. to the planet carrier in the present embodiment with a star gearbox 30, or to the ring gear 38 in planetary embodiments) and a point at which it connects to the stationary supporting structure 24. The gearbox support may be formed by any number of separate components providing a coupling between those two points. The gearbox support 40 connects to the gearbox 30, and more specifically to the static gear or gearset—i.e. to the ring gear 38 of a planetary gearbox or the planet carrier 34/planet gear set 32 of a star gearbox. The gearbox support 40 has a degree of flexibility. Gearbox support torsional stiffness is a measure of the resistance of the support 40 to an applied torque, τ, as illustrated in FIG. 21B. It may be described as resistance to twisting, or winding, of the support 40. The axis of the moment is parallel to the engine axis 9. The cross-hatching of the stationary support structure 24 is provided to indicate the connection to the support 40 being treated as rigid and non-rotating.

For a star gearbox 30, the torsional stiffness of the gearbox support 40 is defined between a circle 902 passing through the centre of each planet gear 32 of the planetary gear set (i.e. through the longitudinal axis of each pin 33) and the interface to the stationary support structure 24, which is treated as fixed. The torsional load is applied at the planet carrier 34, and reacted at the stationary support structure 24.

For a planetary gearbox 30, the torsional stiffness of the gearbox support 40 is defined between the pitch circle diameter (PCD) of the ring gear 38, and the interface to the stationary support structure 24, which is treated as fixed. The torsional load is applied at the ring gear 38, and reacted at the stationary support structure 24. A torque, τ, is applied to the teeth of the ring gear 38 and causes a rotational deformation, θ (e.g. twist) of the support 40. The angle through which a point on the PCD moves is θ, where θ is the angle measured in radians A radius, r, may be defined as the radius of the ring gear 38 (i.e. half of the PCD of the ring gear). An effective linear torsional stiffness can therefore be defined for the gearbox support 40 for a planetary gearbox 30 as described above using the radius r=PCD/2.

The pitch circle of a gear is an imaginary circle that rolls without slipping with the pitch circle of any other gear with which the first gear is meshed. The pitch circle passes through the points where the teeth of two gears meet as the meshed gears rotate—the pitch circle of a gear generally passes through a mid-point of the length of the teeth of the gear. The PCD can be roughly estimated by taking the average of the diameter between tips of the gear teeth and the diameter between bases of the gear teeth. In various embodiments the PCD of the ring gear 38, which may also be thought of as a diameter of the gearbox 30, may be greater than or equal to 0.55 m, and optionally greater than or equal to 0.57 m. In some embodiments, for example in embodiments in which the fan diameter is in the range from 330 to 380 cm, the gearbox diameter may be greater than or equal to 0.75 m.

In various embodiments the diameter of the gearbox 30 may be in the range from 0.55 m to 1.2 m, and optionally in the range from 0.57 to 1.0 m. In some embodiments, for example in embodiments in which the fan diameter is in the range from 240 to 280 cm the gearbox diameter may be in the range from 0.55 to 0.70 m, and optionally may be in the range from 0.58 to 0.65 m (and optionally may be equal to 0.61 m). In some embodiments, for example in embodiments in which the fan diameter is in the range from 330 to 380 cm, the gearbox diameter may be in the range from 0.75 to 1.0 m, and optionally from 0.8 to 0.9 m (and optionally may be equal to 0.87 m).

Correspondingly, an effective linear torsional stiffness can therefore be defined for the gearbox support 40 for a star gearbox 30 as described above using the radius r of the circle 902 passing through the longitudinal axis of each pin 33 on the carrier 34. The diameter of this circle 902 may be described as a PCD of the planetary gear set, or a pin PCD, so providing r=PCD/2 as for the planetary gearbox example. The pin PCD may be in the range from 0.38 to 0.65 m, for example being equal to 0.4 m or 0.55 m.

In various embodiments, the torsional stiffness of the gearbox support 40 is greater than or equal to $4.2 \times 10^7$ Nm/rad, and optionally greater than or equal to $4.8 \times 10^7$ Nm/rad. In some embodiments, for example in embodiments in which the fan diameter is in the range from 240 to 280 cm the torsional stiffness of the gearbox support 40 may be greater than or equal to $4.2 \times 10^7$ Nm/rad, and optionally may be greater than or equal to $5 \times 10^7$ Nm/rad (and optionally may be equal to $6.1 \times 10^7$ Nm/rad). In some embodiments, for example in embodiments in which the fan diameter is in the range from 330 to 380 cm, the torsional stiffness of the gearbox support 40 may be greater than or equal to $7.0 \times 10^7$ Nm/rad, and optionally may be greater than or equal to $9 \times 10^7$ Nm/rad (and optionally may be equal to $1.8 \times 10^8$ Nm/rad).

In various embodiments, the torsional stiffness of the gearbox support 40 is in the range from $4.2 \times 10^7$ to $1.0 \times 10^{10}$ Nm/rad, and optionally in the range from $4.8 \times 10^7$ to $1.0 \times 10^9$ Nm/rad. In some embodiments, for example in embodiments in which the fan diameter is in the range from 240 to 280 cm the torsional stiffness of the gearbox support 40 may be in the range from $4.2 \times 10^7$ to $6.0 \times 10^8$ Nm/rad, and optionally may be in the range from $5 \times 10^7$ to $7 \times 10^7$ Nm/rad (and optionally may be equal to $6.1 \times 10^7$ Nm/rad). In some embodiments, for example in embodiments in which the fan diameter is in the range from 330 to 380 cm, the torsional stiffness of the gearbox support 40 may be in the range from $7.0 \times 10^7$ to $1.0 \times 10^{10}$ Nm/rad, and optionally may be in the range from $9 \times 10^7$ to $4 \times 10^8$ Nm/rad (and optionally may be equal to $1.8 \times 10^8$ Nm/rad).

In various embodiments, the effective linear torsional stiffness of the gearbox support 40 is greater than $7.1 \times 10^8$ N/m, and optionally greater than $8.4 \times 10^8$ N/m. In some embodiments, for example in embodiments in which the fan diameter is in the range from 240 to 280 cm the effective linear torsional stiffness of the gearbox support 40 may be greater than $7.1 \times 10^8$ N/m, and optionally may be greater than $8 \times 10^8$ N/m (and optionally may be equal to $9.2 \times 10^8$ N/m). In some embodiments, for example in embodiments in which the fan diameter is in the range from 330 to 380 cm, the effective linear torsional stiffness of the gearbox support

40 may be greater than $9.0 \times 10^8$ N/m, and optionally may be greater than $9.6 \times 10^8$ N/m (and optionally may be equal to $1.2 \times 10^9$ N/m).

In various embodiments, the effective linear torsional stiffness of the gearbox support 40 is in the range from $7.1 \times 10^8$ to $6.0 \times 10^{10}$ N/m, and optionally in the range from $8.4 \times 10^8$ to $3.0 \times 10^{10}$ N/m. In some embodiments, for example in embodiments in which the fan diameter is in the range from 240 to 280 cm the effective linear torsional stiffness of the gearbox support 40 may be in the range from $7.1 \times 10^8$ to $5.0 \times 10^{10}$ N/m, and optionally may be in the range from $8 \times 10^8$ to $1 \times 10^9$ N/m (and optionally may be equal to $9.2 \times 10^8$ N/m). In some embodiments, for example in embodiments in which the fan diameter is in the range from 330 to 380 cm, the effective linear torsional stiffness of the gearbox support 40 may be in the range from $9.0 \times 10^8$ to $6.0 \times 10^{10}$ N/m, and optionally may be in the range from $9.0 \times 10^8$ to $2.0 \times 10^9$ N/m (and optionally may be equal to $1.2 \times 10^9$ N/m).

The skilled person would appreciate that the stiffness of the gearbox support 40 may be defined in the same way for embodiments with different epicyclic gearboxes, e.g. planetary gearboxes.

One or more of gearbox support 40 geometry, materials, and connection type for the connection to the stationary support structure 24 may be selected or adjusted as appropriate to obtain the desired stiffness.

The inventor has discovered that particular ratios of the parameters defined above have significant impact on gearbox performance. In particular, one, some or all of the below may apply to any embodiment:

In various embodiments, a radial to torsional carrier stiffness ratio of:

$$\frac{\text{the radial bending stiffness of the planet carrier (34)}}{\text{the effective linear torsional stiffness of the planet carrier (34)}}$$

is greater than or equal to 0.030, and optionally in the range from 0.030 to 2.0.

In various embodiments, the radial to torsional carrier stiffness ratio is in the range from $3.0 \times 10^{-2}$ to $2.0 \times 10^0$ (i.e. from 0.030 to 2.0), and optionally in the range from $6.0 \times 10^{-2}$ to 1.0. In some embodiments, the radial to torsional carrier stiffness ratio may be in the range from $6.0 \times 10^{-2}$ to $3.0 \times 10^{-1}$, and optionally may be in the range from 0.18 to 0.19 (and optionally may be equal to 0.18). In some embodiments, the radial to torsional carrier stiffness ratio may be in the range from 0.30 to 2.0. In alternative such embodiments, the radial to torsional carrier stiffness ratio may be in the range from 0.14 to 0.8, and optionally may be in the range from 0.14 to 0.19 (and optionally may be equal to 0.14).

In various embodiments, a product of the components of the radial to torsional carrier stiffness ratio, i.e. the radial bending stiffness of the planet carrier 34 multiplied by the effective linear torsional stiffness of the planet carrier 34, may be calculated. The value of this product, in various embodiments, may be greater than or equal to $5.0 \times 10^{18}$ $N^2m^{-2}$, and optionally less than $1.3 \times 10^{24}$ $N^2m^{-2}$, and optionally may be greater than or equal to $1.6 \times 10^{19}$ $N^2m^{-2}$, and optionally less than $1.3 \times 10^{22}$ $N^2m^{-2}$. In some embodiments, for example in embodiments in which the fan diameter is in the range from 240 to 280 cm, the product value may be greater than or equal to $1.6 \times 10^{19}$ $N^2m^{-2}$, and optionally less than $1.3 \times 10^{22}$ $N^2m^{-2}$. In some embodiments, for example in embodiments in which the fan diameter is in the range from 330 to 380 cm, the product value may be greater than or equal to $3.0 \times 10^{19}$ $N^2m^{-2}$, and optionally less than $1.3 \times 10^{23}$ $N^2m^{-2}$.

In various embodiments, a tilt to torsional carrier stiffness ratio of:

$$\frac{\text{the tilt stiffness of the planet carrier (34)}}{\text{the torsional stiffness of the planet carrier (34)}}$$

is less than or equal to 20, and optionally less than or equal to 7.3.

In various embodiments, the tilt to torsional carrier stiffness ratio is in the range from $7.00 \times 10^{-1}$ to $2.0 \times 10^1$ (i.e. from 0.7 to 20), and optionally in the range from 0.7 to 7.3. In some embodiments, for example in embodiments in which the fan diameter is in the range from 240 to 280 cm the tilt to torsional carrier stiffness ratio may be less than or equal to 8.0, optionally in the range from 2.5 to 8.0, and further optionally may be in the range from 4 to 7 (and optionally may be equal to 5.60). In some embodiments, for example in embodiments in which the fan diameter is in the range from 330 to 380 cm, the tilt to torsional carrier stiffness ratio may be less than or equal to 7.9, optionally in the range from 1.5 to 7.9, and further optionally may be in the range from 1.8 to 5.2 (and optionally may be equal to 2.63).

In various embodiments, a product of the components of the tilt to torsional carrier stiffness ratio, i.e. the tilt stiffness of the planet carrier (34) multiplied by the torsional stiffness of the planet carrier (34), may be calculated. The value of this product, in various embodiments, may be greater than or equal to $1.0 \times 10^{17}$ $N^2m^2rad^{-2}$, and optionally less than $2.8 \times 10^{22}$ $N^2m^2rad^{-2}$, and optionally may be greater than or equal to $5.1 \times 10^{17}$ $N^2m^2rad^{-2}$, and optionally less than $3.0 \times 10^{21}$ $N^2m^2rad^{-2}$. In some embodiments, for example in embodiments in which the fan diameter is in the range from 240 to 280 cm, the product value may be greater than or equal to $5.1 \times 10^{17}$ $N^2m^2rad^{-2}$, and optionally less than $3.0 \times 10^{20}$ $N^2m^2rad^{-2}$. In some embodiments, for example in embodiments in which the fan diameter is in the range from 330 to 380 cm, the product value may be greater than or equal to $1.0 \times 10^{18}$ $N^2m^2rad^{-2}$, and optionally less than $3.1 \times 10^{21}$ $N^2m^2rad^{-2}$.

In various embodiments, a carrier to gearbox input shaft torsional stiffness ratio of:

$$\frac{\text{the torsional stiffness of the planet carrier (34)}}{\text{the torsional stiffness of the gearbox input shaft (26a)}}$$

is greater than or equal to $7.0 \times 10^1$.

In various embodiments, the carrier to gearbox input shaft torsional stiffness ratio may be greater than or equal to $7.5 \times 10^1$. In some embodiments, for example in embodiments in which the fan diameter is in the range from 240 to 280 cm the carrier to gearbox input shaft torsional stiffness ratio may greater than or equal to $7.3 \times 10^1$, and optionally may be greater than or equal to $9.5 \times 10^1$ or $14.0 \times 10^1$ (and optionally may be equal to 152). In some embodiments, for example in embodiments in which the fan diameter is in the range from 330 to 380 cm, the carrier to gearbox input shaft torsional stiffness ratio may be greater than or equal to $1.0 \times 10^2$, and optionally may be greater than or equal to $1.5 \times 10^2$ (and optionally may be equal to $2.0 \times 10^2$). In various embodiments, the carrier to gearbox input shaft torsional stiffness ratio may be greater than or equal to $1.4 \times 10^2$, and optionally in the range from $1.4 \times 10^2$ and to $5.4 \times 10^2$.

In various embodiments, the carrier to gearbox input shaft torsional stiffness ratio may be in the range from $7 \times 10^1$ to $5 \times 10^3$ (i.e. 70 to 5000), and optionally from $7.5 \times 10^1$ to $3.0 \times 10^3$. In some embodiments, for example in embodiments in which the fan diameter is in the range from 240 to 280 cm the carrier to gearbox input shaft torsional stiffness ratio may be in the range from $7.3 \times 10^1$ to $1.0 \times 10^3$, and optionally may be in the range from $9.5 \times 10^1$ or $14.0 \times 10^1$ to $3.0 \times 10^2$ (and optionally may be equal to 152). In some embodiments, for example in embodiments in which the fan diameter is in the range from 330 to 380 cm, the carrier to gearbox input shaft torsional stiffness ratio may be in the range from $1.0 \times 10^2$ to $5.0 \times 10^3$, and optionally may be in the range from $1.5 \times 10^2$ to $2.7 \times 10^2$ (and optionally may be equal to $2.0 \times 10^2$).

In various embodiments, a product of the components of the carrier to gearbox input shaft torsional stiffness ratio, i.e. the torsional stiffness of the planet carrier (34) multiplied by the torsional stiffness of the gearbox input shaft (26a), may be calculated. The value of this product, in various embodiments, may be greater than or equal to $1.5 \times 10^{14}$ $N^2m^2rad^{-2}$, and optionally less than $1.0 \times 10^{17}$ $N^2m^2rad^{-2}$, and optionally may be greater than or equal to $2.2 \times 10^{14}$ $N^2m^2rad^{-2}$, and optionally less than $5.0 \times 10^{16}$ $N^2m^2rad^{-2}$. In some embodiments, for example in embodiments in which the fan diameter is in the range from 240 to 280 cm, the product value may be greater than or equal to $1.5 \times 10^{14}$ $N^2m^2rad^{-2}$, and optionally less than $1.0 \times 10^{16}$ $N^2m^2rad^{-2}$. In some embodiments, for example in embodiments in which the fan diameter is in the range from 330 to 380 cm, the product value may be greater than or equal to $3.0 \times 10^{15}$ $N^2m^2rad^{-2}$, and optionally less than $1.0 \times 10^{17}$ $N^2m^2rad^{-2}$.

In various embodiments, a carrier to gearbox support torsional stiffness ratio of:

$$\frac{\text{the torsional stiffness of the planet carrier (34)}}{\text{the torsional stiffness of the gearbox support (40)}}$$

is greater than or equal to 2.3.

In various embodiments, the carrier to gearbox support torsional stiffness ratio may be greater than or equal to 2.3, and optionally greater than or equal to 2.6. In some embodiments, for example in embodiments in which the fan diameter is in the range from 240 to 280 cm carrier to gearbox support torsional stiffness ratio may be greater than or equal to 2.3, and optionally may be greater than or equal to 2.5 (and optionally may be equal to 4.8). In some embodiments, for example in embodiments in which the fan diameter is in the range from 330 to 380 cm, the carrier to gearbox support torsional stiffness ratio may be greater than or equal to 3.5, and optionally may be greater than or equal to 4 (and optionally may be equal to 6.5). In various embodiments, the carrier to gearbox support torsional stiffness ratio may be greater than or equal to 4.4, and optionally in the range from 4.4 or 4.5 to 15.5.

In various embodiments, the carrier to gearbox support torsional stiffness ratio may be in the range from $2.3 \times 10^0$ to $3.0 \times 10^2$ (i.e. 2.3 to 300), and optionally from 2.6 to 50. In some embodiments, for example in embodiments in which the fan diameter is in the range from 240 to 280 cm, the carrier to gearbox support torsional stiffness ratio may be in the range from 2.3 to 30, and optionally may be in the range from 2.5 to 5.5 or from 4.3 to 5.5 (and optionally may be equal to 4.8). In some embodiments, for example in embodiments in which the fan diameter is in the range from 330 to 380 cm, the carrier to gearbox support torsional stiffness ratio may be in the range from 3.5 to 300, and optionally may be in the range from 4 to 15 (and optionally may be equal to 6.5).

In various embodiments, a product of the components of the carrier to gearbox support torsional stiffness ratio i.e. the torsional stiffness of the planet carrier 34 multiplied by the torsional stiffness of the gearbox support 40, may be calculated. The value of this product, in various embodiments, may be greater than or equal to $5.0 \times 10^{15}$ $N^2m^2rad^{-2}$, and optionally less than $1.0 \times 10^{19}$ $N^2m^2rad^{-2}$, and optionally may be greater than or equal to $8.0 \times 10^{15}$ $N^2m^2rad^{-2}$, and optionally less than $2.0 \times 10^{18}$ $N^2m^2rad^{-2}$. In some embodiments, for example in embodiments in which the fan diameter is in the range from 240 to 280 cm, the product value may be greater than or equal to $5.0 \times 10^{15}$ $N^2m^2rad^{-2}$, and optionally less than to $1.2 \times 10^{17}$ $N^2m^2rad^{-2}$. In some embodiments, for example in embodiments in which the fan diameter is in the range from 330 to 380 cm, the product value may be greater than or equal to $1.0 \times 10^{17}$ $N^2m^2rad^{-2}$, and optionally less than $1.0 \times 10^{19}$ $N^2m^2rad^{-2}$.

In various embodiments, a carrier to fan shaft stiffness ratio of:

$$\frac{\text{the torsional stiffness of the planet carrier (34)}}{\text{the torsional stiffness of the fan shaft (36)}}$$

is greater than or equal to 8.

In various embodiments, the carrier to fan shaft stiffness ratio may be greater than or equal to $8.0 \times 10^0$ (i.e. 8.0), and optionally greater than or equal to 9. In some embodiments, for example in embodiments in which the fan diameter is in the range from 240 to 280 cm, the carrier to fan shaft stiffness ratio may be greater than or equal to 8, and optionally may be greater than or equal to 9 or 15.1 (and optionally may be equal to 16.6). In some embodiments, for example in embodiments in which the fan diameter is in the range from 330 to 380 cm, the carrier to fan shaft stiffness ratio may be greater than or equal to 12, and optionally may be greater than or equal to 15 or 18 (and optionally may be equal to 22.2). In various embodiments, the carrier to fan shaft stiffness ratio may be greater than or equal to $1.50 \times 10^1$, and optionally greater than or equal to $1.6 \times 10^1$; the carrier to fan shaft stiffness ratio may be smaller than $8.4 \times 10^1$ in such embodiments.

In various embodiments, the carrier to fan shaft stiffness ratio may be in the range from $8.0 \times 10^0$ to $1.1 \times 10^3$ (i.e. 8.0 to 1100), and optionally from 9 to $1.9 \times 10^2$. In some embodiments, for example in embodiments in which the fan diameter is in the range from 240 to 280 cm, the carrier to fan shaft stiffness ratio may be in the range from 8 to $5.0 \times 10^2$, and optionally may be in the range from 9 to 40 or from 15 or 16 to 40 (and optionally may be equal to 17). In some embodiments, for example in embodiments in which the fan diameter is in the range from 330 to 380 cm, the carrier to fan shaft stiffness ratio may be in the range from 12 to $1.1 \times 10^3$, and optionally may be in the range from 15 or 18 to 55 (and optionally may be equal to 22).

In various embodiments, a product of the components of the carrier to fan shaft stiffness ratio i.e. the torsional stiffness of the planet carrier 34 multiplied by the torsional stiffness of the fan shaft 36, may be calculated. The value of this product, in various embodiments, may be greater than or equal to $1.5 \times 10^{15}$ N²m²rad⁻², and optionally less than $3.0 \times 10^{18}$ N²m²rad⁻², and optionally may be greater than or equal to $2.0 \times 10^{15}$ N²m²rad⁻², and optionally less than $7.0 \times 10^{17}$ N²m²rad⁻². In some embodiments, for example in embodiments in which the fan diameter is in the range from 240 to 280 cm, the product value may be greater than or equal to $1.5 \times 10^{15}$ N²m²rad⁻², and optionally less than to $1.5 \times 10^{17}$ N²m²rad⁻². In some embodiments, for example in embodiments in which the fan diameter is in the range from 330 to 380 cm, the product value may be greater than or equal to $9.0 \times 10^{15}$ N²m²rad⁻², and optionally less than $3.0 \times 10^{18}$ N²m²rad⁻².

In various embodiments, a first carrier to pin stiffness ratio of:

$$\frac{\text{the effective linear torsional stiffness of the planet carrier (34)}}{\text{the radial bending stiffness of each pin (33)}}$$

is greater than or equal to 10, and optionally greater than or equal to 15. In some embodiments, for example in embodiments in which the fan diameter is in the range from 240 to 280 cm, the first carrier to pin stiffness ratio shaft may be greater than or equal to $1.5 \times 10^1$, and optionally may be equal to 16.3. In some embodiments, for example in embodiments in which the fan diameter is in the range from 330 to 380 cm, the first carrier to pin stiffness ratio may be greater than or equal to $1.6 \times 10^1$ and optionally may be greater than or equal to 16.5 (and optionally may be equal to 18.7).

In various embodiments, the first carrier to pin stiffness ratio is in the range from $1.0 \times 10^1$ to $4.0 \times 10^1$ (i.e. from 10 to 40), and optionally in the range from $1.5 \times 10^1$ to $3.0 \times 10^1$. In some embodiments, for example in embodiments in which the fan diameter is in the range from 240 to 280 cm, the first carrier to pin stiffness ratio shaft may be in the range from $1.5 \times 10^1$ to $2.5 \times 10^1$, and optionally may be in the range from 15 to 19 (and optionally may be equal to 16.3). In some embodiments, for example in embodiments in which the fan diameter is in the range from 330 to 380 cm, the first carrier to pin stiffness ratio may be in the range from $1.6 \times 10^1$ to $3.5 \times 10^1$ and optionally may be in the range from 16 or 16.5 to 20 (and optionally may be equal to 18.7).

The product of the effective linear torsional stiffness of the planet carrier 34 and the radial bending stiffness of each pin 33 may be greater than or equal to $2.1 \times 10^{18}$ N²m⁻², and optionally greater than or equal to $5.8 \times 10^{18}$ N²m⁻². In some embodiments, for example in embodiments in which the fan diameter is in the range from 240 to 280 cm, the product of the effective linear torsional stiffness of the planet carrier 34 and the radial bending stiffness of each pin 33 may be greater than or equal to $5.3 \times 10^{18}$ N²m⁻². In some embodiments, for example in embodiments in which the fan diameter is in the range from 330 to 380 cm, the product of the effective linear torsional stiffness of the planet carrier 34 and the radial bending stiffness of each pin 33 may be greater than or equal to $1.2 \times 10^{19}$ N²m⁻².

The product of the effective linear torsional stiffness of the planet carrier 34 and the radial bending stiffness of each pin 33 may be in the range from $2.1 \times 10^{18}$ to $3.6 \times 10^{20}$ N²m⁻², and optionally in the range from $5.8 \times 10^{18}$ to $1.7 \times 10^{20}$ N²m⁻². In some embodiments, for example in embodiments in which the fan diameter is in the range from 240 to 280 cm, the product of the effective linear torsional stiffness of the planet carrier 34 and the radial bending stiffness of each pin 33 may be in the range from $5.3 \times 10^{18}$ to $4.0 \times 10^{19}$ N²m⁻². In some embodiments, for example in embodiments in which the fan diameter is in the range from 330 to 380 cm, the product of the effective linear torsional stiffness of the planet carrier 34 and the radial bending stiffness of each pin 33 may be in the range from $1.2 \times 10^{19}$ to $1.7 \times 10^{20}$ N²m⁻².

In various embodiments, a second carrier to pin stiffness ratio of:

$$\frac{\text{the torsional stiffness of the planet carrier (34)}}{\text{the tilt stiffness of each pin (33)}}$$

is greater than or equal to $2.4 \times 10^1$, and optionally greater than or equal to $3.4 \times 10^1$. In some embodiments, for example in embodiments in which the fan diameter is in the range from 240 to 280 cm, the second carrier to pin stiffness ratio may be greater than or equal to $3.4 \times 10^1$, optionally greater than or equal to 36, and optionally may be equal to 47.5. In some embodiments, for example in embodiments in which the fan diameter is in the range from 330 to 380 cm, the second carrier to pin stiffness ratio may be greater than or equal to $4.0 \times 10^1$ and optionally may be greater than or equal to 45 (and optionally may be equal to 69.1).

In various embodiments, the second carrier to pin stiffness ratio is in the range from $2.4 \times 10^1$ to $1.8 \times 10^1$ (i.e. from 24 to 180), and optionally in the range from $3.4 \times 10^1$ to $1.4 \times 10^2$. In some embodiments, for example in embodiments in which the fan diameter is in the range from 240 to 280 cm, the second carrier to pin stiffness ratio shaft may be in the range from $3.4 \times 10^1$ to $1.2 \times 10^2$, and optionally may be in the range from 36 to 58 (and optionally may be equal to 47.5). In some embodiments, for example in embodiments in which the fan diameter is in the range from 330 to 380 cm, the second carrier to pin stiffness ratio may be in the range from $4.0 \times 10^1$ to $1.8 \times 10^2$ and optionally may be in the range from 45 to 95 (and optionally may be equal to 69.1).

The product of the torsional stiffness of the planet carrier 34 and the tilt stiffness of each pin 33 may be greater than or equal to $1.0 \times 10^{15}$ N²m²rad⁻², and optionally greater than or equal to $2.5 \times 10^{15}$ N²m²rad⁻². In some embodiments, for example in embodiments in which the fan diameter is in the range from 240 to 280 cm, the product of the torsional stiffness of the planet carrier 34 and the tilt stiffness of each pin 33 may be greater than or equal to $2.5 \times 10^{15}$ N²m²rad⁻². In some embodiments, for example in embodiments in which the fan diameter is in the range from 330 to 380 cm, the product of the torsional stiffness of the planet carrier 34 and the tilt stiffness of each pin 33 may be greater than or equal to $1.4 \times 10^{16}$ N²m²rad⁻².

The product of the torsional stiffness of the planet carrier 34 and the tilt stiffness of each pin 33 may be in the range from $1.0 \times 10^{15}$ to $4.7 \times 10^{17}$ N²m²rad⁻², and optionally in the range from $2.5 \times 10^{15}$ to $2.0 \times 10^{17}$ N²m²rad⁻². In some embodiments, for example in embodiments in which the fan diameter is in the range from 240 to 280 cm, the product of the torsional stiffness of the planet carrier 34 and the tilt stiffness of each pin 33 may be in the range from $2.5 \times 10^{15}$ to $3.0 \times 10^{16}$ N²m²rad⁻². In some embodiments, for example in embodiments in which the fan diameter is in the range from 330 to 380 cm, the torsional stiffness of the planet carrier 34 and the tilt stiffness of each pin 33 may be in the range from $1.4 \times 10^{16}$ to $4.7 \times 10^{17}$ N²m²rad⁻².

FIG. 26 illustrates how the stiffnesses defined herein may be measured. FIG. 26 shows a plot of the displacement δ resulting from the application of a load L (e.g. a force, moment or torque) applied to a component for which the stiffness is being measured. At levels of load from zero to $L_P$ there is a non-linear region in which displacement is caused by motion of the component (or relative motion of separate parts of the component) as it is loaded, rather than deformation of the component; for example moving within clearance between parts. At levels of load above $L_Q$ the elastic limit of the component has been exceeded and the applied load no longer causes elastic deformation—plastic deformation or failure of the component may occur instead. Between points P and Q the applied load and resulting displacement have a linear relationship. The stiffnesses defined herein may be determined by measuring the gradient of the linear region between points P and Q (with the stiffness being the inverse of that gradient). The gradient may be found for as large a region of the linear region as possible to increase the accuracy of the measurement by providing a larger displacement to measure. For example, the gradient may be found by applying a load equal to or just greater than $L_P$ and equal to or just less than $L_Q$. Values for $L_P$ and $L_Q$ may be estimated prior to testing based on materials characteristics so as to apply suitable loads. Although the displacement is referred to as δ in this description, the skilled person would appreciate that equivalent principles would apply to a linear or angular displacement.

The stiffnesses defined herein, unless otherwise stated, are for the corresponding component(s) when the engine is off (i.e. at zero speed/on the bench). The stiffnesses generally do not vary significantly over the operating range of the engine; the stiffness at cruise conditions of the aircraft to which the engine is used (those cruise conditions being as defined elsewhere herein) may therefore be the same as for when the engine is not in use. However, where the stiffness varies over the operating range of the engine, the stiffnesses defined herein are to be understood as being values for when the engine is at room temperature and unmoving.

The present disclosure also relates to methods 1300 of operating a gas turbine engine 10 on an aircraft. The methods 1300 are illustrated in FIG. 27. The method 1300 comprises starting up and operating 1302 the engine 10 (e.g taxiing on a runway, take-off, and climb of the aircraft, as suitable) to reach cruise conditions.

Once cruise conditions have been reached, the method 1300 then comprises operating 1304 the gas turbine engine 10, which may be as described in one or more embodiments elsewhere herein, to provide propulsion under cruise conditions.

The gas turbine engine 10 is such that, and/or is operated such that, any or all of the parameters or ratios defined herein are within the specified ranges.

The torque on the core shaft 26 may be referred to as the input torque, as this is the torque which is input to the gearbox 30. Torque has units of [force]×[distance] and may be expressed in units of Newton metres (N·m), and is defined in the usual way as would be understood by the skilled person.

The torque supplied by the turbine 19 to the core shaft (i.e. the torque on the core shaft) at cruise conditions may be greater than or equal to 10,000 Nm, and optionally greater than or equal to 11,000 Nm. In some embodiments, for example in embodiments in which the fan diameter is in the range from 240 to 280 cm, the torque on the core shaft 26 at cruise conditions may be greater than or equal to 10,000 Nm (and optionally may be equal to 12,760 Nm). In some embodiments, for example in embodiments in which the fan diameter is in the range from 330 to 380 cm, the torque on the core shaft 26 at cruise conditions may be greater than or equal to 25,000 Nm, and optionally greater than or equal to 30,000 Nm (and optionally may be equal to 33,970 Nm, or 34,000 Nm).

The torque on the core shaft at cruise conditions may be in the range from 10,000 to 50,000 Nm, and optionally from 11,000 to 45,000 Nm. In some embodiments, for example in embodiments in which the fan diameter is in the range from 240 to 280 cm, the torque on the core shaft 26 at cruise conditions may be in the range from 10,000 to 15,000 Nm, and optionally from 11,000 to 14,000 Nm (and optionally may be equal to 12,760 Nm). In some embodiments, for example in embodiments in which the fan diameter is in the range from 330 to 380 cm, the torque on the core shaft 26 at cruise conditions may be in the range from 25,000 Nm or 50,000 Nm, and optionally from 30,000 to 40,000 Nm (and optionally may be equal to 33,970 Nm, or 34,000 Nm).

Under maximum take-off (MTO) conditions, the torque on the core shaft 26 may be greater than or equal to 28,000 Nm, and optionally greater than or equal to 30,000 Nm. In some embodiments, for example in embodiments in which the fan diameter is in the range from 240 to 280 cm, the torque on the core shaft 26 under MTO conditions may be greater than or equal to 28,000, and optionally greater than or equal to 35,000 Nm (and optionally may be equal to 36,300 Nm). In some embodiments, for example in embodiments in which the fan diameter is in the range from 330 to 380 cm, the torque on the core shaft 26 under MTO conditions may greater than or equal to 70,000 Nm, and optionally greater than or equal to 80,000 or 82,000 Nm (and optionally may be equal to 87,000 Nm or 87,100 Nm).

Under maximum take-off (MTO) conditions, the torque on the core shaft 26 may be in the range from 28,000 Nm to 135,000 Nm, and optionally in the range from 30,000 to 110,000 Nm. In some embodiments, for example in embodiments in which the fan diameter is in the range from 240 to 280 cm, the torque on the core shaft 26 under MTO conditions may be in the range from 28,000 to 50,000 Nm, and optionally from 35,000 to 38,000 Nm (and optionally may be equal to 36,000 Nm or 36,300 Nm). In some embodiments, for example in embodiments in which the fan diameter is in the range from 330 to 380 cm, the torque on the core shaft 26 under MTO conditions may be in the range from 70,000 Nm or 135,000 Nm, and optionally from 80,000 to 90,000 Nm or 82,000 to 92,000 Nm (and optionally may be equal to 87,000 Nm or 87,100 Nm).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. A gas turbine engine for an aircraft comprising:
an engine core comprising a turbine, a compressor, and a core shaft connecting the turbine to the compressor;
a fan located upstream of the engine core, the fan comprising a plurality of fan blades;
a gearbox that receives an input from a gearbox input shaft that is a portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier on which the plurality of planet gears are mounted; and a gearbox support arranged to support the gearbox in a fixed position within the gas turbine engine and having a torsional stiffness, wherein a planet carrier to gearbox support torsional stiffness ratio of:

$$\frac{\text{a torsional stiffness of the planet carrier}}{\text{the torsional stiffness of the gearbox support}}$$

is in the range from 2.3 to 300.

2. The gas turbine engine of claim 1, wherein the planet carrier to gearbox support torsional stiffness ratio is in the range from 2.6 to 50.

3. The gas turbine engine of claim 1, wherein the torsional stiffness of the planet carrier is in the range from $1.60 \times 10^8$ to $1.00 \times 10^{11}$ Nm/rad.

4. The gas turbine engine of claim 1, wherein a torsional stiffness of the gearbox input shaft is in the range from $1.4 \times 10^6$ Nm/radian to $2.5 \times 10^8$ Nm/radian.

5. The gas turbine engine of claim 1, wherein the torsional stiffness of the gearbox support is in the range from $4.2 \times 10^7$ Nm/radian $1.0 \times 10^{10}$ Nm/radian.

6. The gas turbine engine of claim 1, wherein the fan has a fan diameter in the range from 240 to 280 cm, and the planet carrier to gearbox support torsional stiffness ratio is in the range from 2.5 to 5.5.

7. The gas turbine engine of claim 1, wherein the fan has a fan diameter in the range from 330 to 380 cm, and the planet carrier to gearbox support torsional stiffness ratio is in the range from 3.5 to 15.

8. The gas turbine engine of claim 1, wherein the torsional stiffness of the planet carrier multiplied by the torsional stiffness of the gearbox support is in the range from $5.0 \times 10^{15}$ $N^2m^2rad^{-2}$ and $1.0 \times 10^{19}$ $N^2m^2rad^{-2}$.

9. The gas turbine engine of claim 1, wherein
the turbine is a first turbine, the compressor is a first compressor, and the core shaft is a first core shaft;
the engine core further comprises a second turbine, a second compressor, and a second core shaft connecting the second turbine to the second compressor; and
the second turbine, the second compressor, and the second core shaft are arranged to rotate at a higher rotational speed than the first core shaft.

10. The gas turbine engine of claim 1, wherein the planet carrier comprises a forward plate and a rearward plate and pins extending between the forward plate and the rearward plate, each of the pins being arranged to have one of the plurality of planet gears mounted thereon.

11. The gas turbine engine of claim 10, wherein the planet carrier further comprises lugs extending between, the forward plate and the rearward plate, the lugs being arranged to pass between adjacent ones of the plurality of planet gears.

12. The gas turbine engine of claim 1, wherein the gearbox comprises 3, 5, or 7 planet gears.

13. The gas turbine engine of claim 1, wherein the fan has a fan diameter greater than 240 cm and less than or equal to 380 cm.

14. The gas turbine engine of claim 1, wherein the gearbox is a star gearbox, in which the planet carrier does not rotate in use.

15. The gas turbine engine of claim 1, wherein a pitch circle diameter of pins on which the plurality of planet gears are mounted is in the range from 0.38 to 0.65 m.

16. The gas turbine engine of claim 1, wherein the core shaft provides a mounting for the sun gear on which the sun gear moves.

17. The gas turbine engine of claim 1, wherein a gear ratio of the gearbox is in the range from 3.2 to 4.5.

18. A propulsor for an aircraft comprising:
a fan comprising a plurality of fan blades;
a gearbox;
a motor for driving the fan via the gearbox, wherein the gearbox is arranged to receive an input from a gearbox input shaft that is a portion of the core shaft driven by the motor and to output drive to the fan so as to drive the fan at a lower rotational speed than the core shaft, the gearbox being an epicyclic gearbox comprising a sun gear, a plurality of planet gears, a ring gear, and a planet carrier on which the plurality of planet gears are mounted; and
a gearbox support arranged to support the gearbox in a fixed position within the propulsor and having a torsional stiffness, wherein
a planet carrier to gearbox support torsional stiffness ratio of:

$$\frac{\text{a torsional stiffness of the planet carrier}}{\text{the torsional stiffness of the gearbox support}}$$

is in the range from 2.3 to 300.

19. The propulsor of claim 18, wherein the planet carrier to gearbox support torsional stiffness ratio is in the range from 2.6 to 50.

20. The propulsor of claim 18, wherein a torsional stiffness of the gearbox input shaft is in the range from $1.4 \times 10^6$ Nm/radian to $2.5 \times 10^8$ Nm/radian.

* * * * *